United States Patent
Beary et al.

(10) Patent No.: US 9,321,117 B2
(45) Date of Patent: Apr. 26, 2016

(54) AUTOMATIC SYSTEM FOR ABRASIVE HARDFACING

(71) Applicant: Vermeer Manufacturing Company, Pella, IA (US)

(72) Inventors: Scott W. Beary, Knoxville, IA (US); Michael J. Proffitt, Knoxville, IA (US); Clint A. Weinberg, Pella, IA (US); Wanti Muchtar, Pella, IA (US); David Landon, Pella, IA (US); Bjorn Johnson, Altoona, IA (US)

(73) Assignee: VERMEER MANUFACTURING COMPANY, Pella, IA (US)

( * ) Notice: Subject to any disclaimer, the term of this patent is extended or adjusted under 35 U.S.C. 154(b) by 0 days.

(21) Appl. No.: 14/725,302

(22) Filed: May 29, 2015

(65) Prior Publication Data

US 2015/0266124 A1    Sep. 24, 2015

Related U.S. Application Data

(63) Continuation-in-part of application No. PCT/US2015/021327, filed on Mar. 18, 2015.

(60) Provisional application No. 61/955,078, filed on Mar. 18, 2014, provisional application No. 62/088,278, filed on Dec. 5, 2014, provisional application No. 62/077,142, filed on Nov. 7, 2014.

(51) Int. Cl.
*B23K 9/04* (2006.01)
*B23K 9/32* (2006.01)

(52) U.S. Cl.
CPC .. *B23K 9/04* (2013.01); *B23K 9/324* (2013.01)

(58) Field of Classification Search
CPC .......... B23K 9/04; B23K 9/042; B23K 9/044; B23K 9/046; B23K 9/048; B23K 37/0461
See application file for complete search history.

(56) References Cited

U.S. PATENT DOCUMENTS

| | | | |
|---|---|---|---|
| 2,841,687 | A | 7/1958 | Richter |
| 3,596,041 | A | 7/1971 | Frus et al. |

(Continued)

FOREIGN PATENT DOCUMENTS

| | | |
|---|---|---|
| GB | 190300301 | 7/1903 |
| GB | 778785 | 7/1957 |

(Continued)

OTHER PUBLICATIONS

Rankin Automation (2004) "Rankin Automation MIG-Carbide Manual Vibratory Feeder Assembly: Reference Manual and Operating Instructions," [online, retrieved from http://www.broco-rankin.com/linkservid/C197EB6E-3048-651A-FE2F97C2A5C4E6B4/showMeta/0/ on Mar. 17, 2015].

(Continued)

*Primary Examiner* — Geoffrey S Evans
(74) *Attorney, Agent, or Firm* — Lathrop & Gage LLP

(57) ABSTRACT

Arc welding systems, apparatus and methods are for hardfacing are provided, including particle feeding apparatus. In one aspect the workpiece is moved in an oscillatory fashion while keeping the welding torch and the particulate delivery system stationary during at least a portion of welding pass. The welding torch and particulate delivery system may also be moved in a non-oscillatory fashion. Process speeds of about 18-30 in/min can be obtained with carbide incorporation of greater than 30% and uniform distribution.

24 Claims, 17 Drawing Sheets

(56) References Cited

U.S. PATENT DOCUMENTS

| | | | |
|---|---|---|---|
| 3,680,797 A | 8/1972 | Covey | |
| 3,929,296 A | 12/1975 | Stoeber | |
| 3,964,601 A | 6/1976 | Armstrong | |
| 4,046,285 A | 9/1977 | Wendt | |
| 4,782,206 A * | 11/1988 | Ayres | B23K 9/048 219/76.14 |
| 5,010,225 A | 4/1991 | Carlin | |
| 5,293,026 A | 3/1994 | Dennis et al. | |
| 5,321,224 A | 6/1994 | Kamimura | |
| 5,552,575 A * | 9/1996 | Doumanidis | B23K 9/1274 219/121.14 |
| 5,587,572 A | 12/1996 | Kirby | |
| 5,683,599 A | 11/1997 | Ellis | |
| 5,873,326 A | 2/1999 | Davet et al. | |
| 5,874,707 A | 2/1999 | Iida et al. | |
| 5,967,436 A | 10/1999 | Balvanz | |
| 6,079,649 A | 6/2000 | Balvanz et al. | |
| 6,131,838 A | 10/2000 | Balvanz et al. | |
| 6,392,190 B1 | 5/2002 | Sue et al. | |
| 6,419,173 B2 | 7/2002 | Balvanz et al. | |
| 6,464,157 B1 | 10/2002 | Balvanz et al. | |
| 6,481,654 B1 | 11/2002 | Balvanz et al. | |
| 6,631,799 B2 | 10/2003 | Samson | |
| 6,649,682 B1 | 11/2003 | Breton et al. | |
| 6,659,267 B2 | 12/2003 | Patterson | |
| 7,104,394 B2 | 9/2006 | Baird et al. | |
| 7,262,240 B1 | 8/2007 | Breton | |
| 7,487,868 B2 | 2/2009 | Kraus et al. | |
| 7,703,411 B1 | 4/2010 | Bakos et al. | |
| 7,757,836 B2 | 7/2010 | Karpinsky et al. | |
| 8,074,750 B2 | 12/2011 | Choe | |
| 8,096,406 B1 | 1/2012 | Mitchell, III | |
| 8,099,929 B2 | 1/2012 | Kirby et al. | |
| 8,181,592 B2 | 5/2012 | Karpinsky et al. | |
| 8,293,386 B2 | 10/2012 | Kathrein | |
| 8,322,466 B2 | 12/2012 | Bird | |
| 8,430,980 B2 | 4/2013 | Muir et al. | |
| 8,450,637 B2 | 5/2013 | Luce et al. | |
| 8,545,997 B2 | 10/2013 | Elkouby et al. | |
| 8,586,214 B2 | 11/2013 | Sakamoto et al. | |
| 8,623,525 B2 | 1/2014 | Waki et al. | |
| 8,698,038 B2 | 4/2014 | Luce et al. | |
| 8,721,761 B2 | 5/2014 | Fischer et al. | |
| 2001/0006199 A1 | 7/2001 | Balvanz et al. | |
| 2003/0068518 A1* | 4/2003 | Ando | B23K 9/04 428/608 |
| 2004/0238666 A1 | 12/2004 | Gray et al. | |
| 2006/0255019 A1 | 11/2006 | Martukanitz et al. | |
| 2009/0074985 A1* | 3/2009 | Bailey | C23C 4/12 427/580 |
| 2010/0065337 A1 | 3/2010 | Luce et al. | |
| 2010/0112375 A1 | 5/2010 | Chiovelli | |
| 2010/0141027 A1* | 6/2010 | Fischer | B62D 55/26 427/580 |
| 2010/0215849 A1* | 8/2010 | Fischer | B23K 9/04 427/180 |
| 2010/0323213 A1* | 12/2010 | Aitchison | B22F 5/10 219/74 |
| 2011/0120977 A1* | 5/2011 | Lai | B23K 9/04 219/73.1 |
| 2012/0325779 A1* | 12/2012 | Yelistratov | B23K 9/04 219/76.14 |
| 2013/0105277 A1 | 5/2013 | Uno et al. | |
| 2013/0252023 A1 | 9/2013 | Balvanz et al. | |
| 2013/0266798 A1* | 10/2013 | Cheney | B23K 9/04 219/74 |
| 2013/0273258 A1 | 10/2013 | Luce et al. | |
| 2013/0294819 A1 | 11/2013 | Menon et al. | |
| 2014/0054273 A1 | 2/2014 | Behmlander et al. | |
| 2014/0345800 A1 | 11/2014 | Kerbiguert et al. | |

FOREIGN PATENT DOCUMENTS

| | | |
|---|---|---|
| JP | 2000-141037 | 5/2000 |
| KR | 10-0247298 | 4/2000 |
| KR | 10-0956318 | 5/2010 |
| WO | WO 02/36238 | 5/2002 |
| WO | WO 2010/147726 A1 | 12/2010 |
| WO | WO 2012/120819 | 9/2012 |
| WO | WO 2012/173611 | 12/2012 |
| WO | WO 2013/087422 | 6/2013 |

OTHER PUBLICATIONS

Broco-Rankin (2015), "Twin-Axis Automated Welding/MIG Carbide Machine" [online, retrieved from http://www.broco-rankin.com/automation/automated-machines/twin-axis-automated-weldingmig-carbide-machine on Apr. 28, 2015].

Broco-Rankin (2015) "Custom Machines" [online, retrieved from http:www.broco-rankin.com/automation/custom-machines/custom-machine-inquiries/ on Apr. 28, 2015].

Modern Application News (2002) "Robotic welding system solves challenging hardfacing task. (Welding/Brazing/Soldering)", Modern Application News, ISSN 0277-9951, [online, retrieved from http://www.thefreelibrary.com/_/print/PrintArticle.aspx?id=84803903 on Apr. 28, 2015].

Mavrix (2009), "Parts, Service, & Sales", [online, retrieved from http://www.mavrixweld.com/pages/parts_service.html on Apr. 28, 2015].

The Fabricator (Apr. 9, 2013) "Chromium carbide materials resist abrasive wear," [online, retrieved from http://www.thefabricator.com/product/metalsmaterials/chromium-carbide-materials-resist-abrasive-wear on Apr. 28, 2015].

Postle Industries [online, retrieved from http://www.tungstencarbidehardfacing.com/PostleMIG-TC.pdf on Apr. 28, 2015].

Martin Vibration System and Solutions, Inc., MARTIN® NTS™ 120-350 Non-Impacting Linear Vibrators [online, retrieved from http://www.shake-it.com/product-line/martin-nts-120-350-non-impacting-linear-vibrators/ on Apr. 28, 2015].

The Cleveland Vibrator Company (2015) "Air Piston Vibrators",[online, retrieved from http://www.clevelandvibrator.com/c-33-air-piston-vibrators.aspx on Apr. 28, 2015].

Navco, "Electromechanical", [online, retrieved from http://www.navco.us/electromechanical on Apr. 28, 2015].

Thomasnet (2006), "World's Smallest Air-piston Vibrator in All Stainless Steel,", [online, retrieved from http://news.thomasnet.com/fullstory/air-piston-vibrator-comes-in-all-stainless-steel-501292 on Apr. 28, 2015].

International Search Report and Written Opinion mailed Jun. 25, 2015, corresponding to International Application No. PCT/US2015/021327.

Klimpel et al. (Jan.-Feb. 2007) "Abrasive and Erosive Wear Resistance of GMA Metal Cored Wire Cermetal Deposits," *Journal of Achievements in Materials and Manufacturing Engineering*. 20:37-44.

International Search Report with Written Opinion corresponding to International Patent Application No. PCT/US2015/059577, mailed Jan. 4, 2016.

* cited by examiner

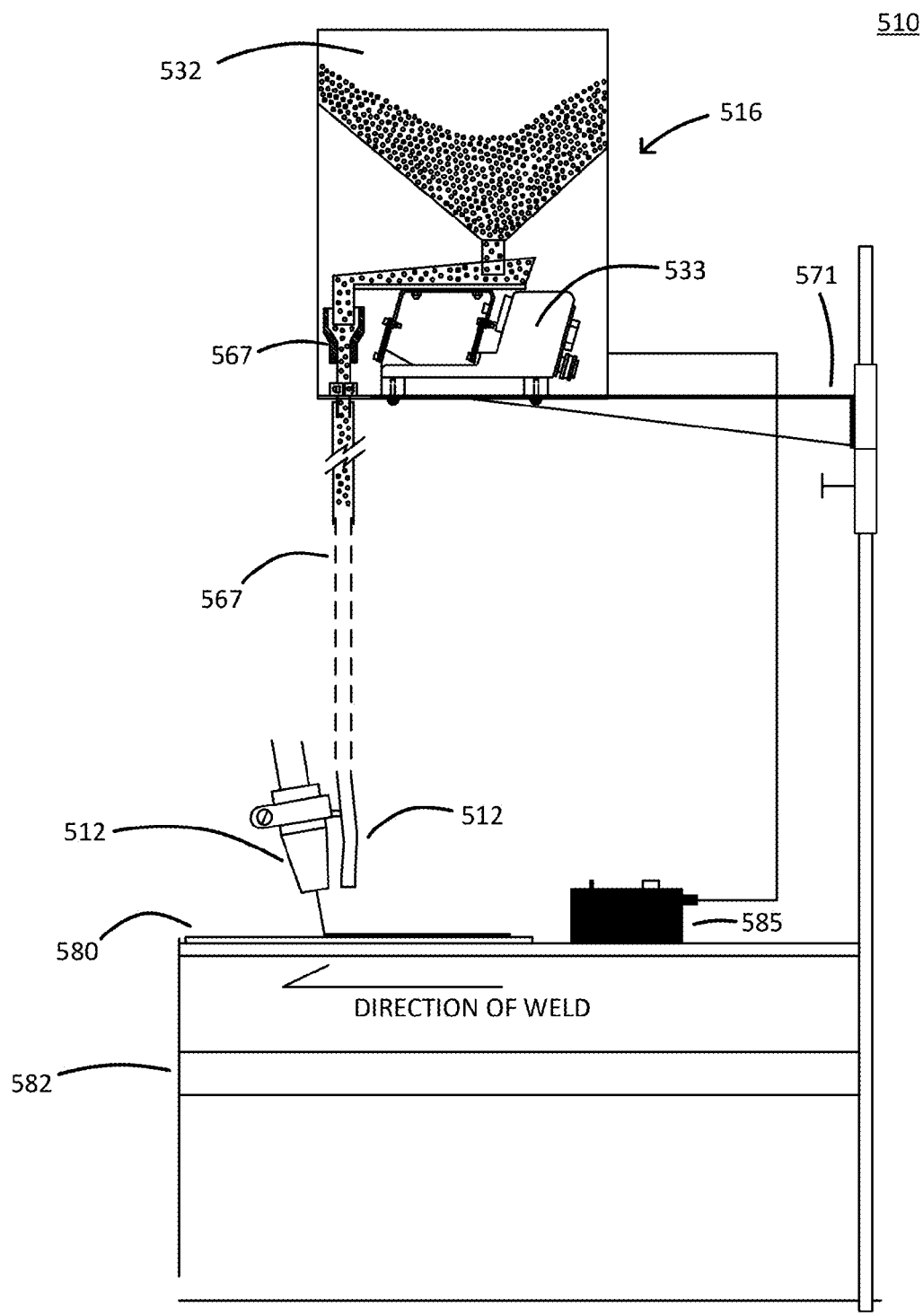
PRIOR ART  FIG. 1

AUTOMATIC SYSTEM FOR ABRASIVE HARDFACING

CROSS-REFERENCE TO RELATED APPLICATIONS

This application is a continuation-in-part of International Application PCT/US15/21327, filed Mar. 18, 2015, which claims the benefit of U.S. Provisional Application Nos. 61/955,078, filed Mar. 18, 2014, 62/077,142, filed Nov. 7, 2014 and 62/088,278, filed Dec. 5, 2014, all of which are hereby incorporated by reference in their entireties.

BACKGROUND OF THE INVENTION

Hardfacing is a metalworking process where harder or tougher material is applied to a base metal, typically by an arc welding process. One common technique for achieving hardfacing is to form a weld puddle on an area to be hardfaced and concurrently feed a particulate with favorable wear and/or abrasive characteristics into the weld puddle, effectively creating a surface composite upon solidification.

Some current robotics-based hardfacing systems employ a workpiece fixed in a given location, with a movable arc welding unit and a concurrently-operating feed system for the particulate (e.g., tungsten carbide) being used together to achieve the desired hardfacing. Such a feed system generally incorporates a stationary bin/source of the carbide, a vibratory flow metering device fixed below the bin/source, a feed-out mechanism, and a delivery hose interconnecting the vibratory flow metering device and the feed-out mechanism. The stationary bin and the associated vibratory flow metering device are often fixed in a position several feet above the welding zone in order, in part, to create a sufficient flow of carbide through the delivery hose (i.e., provide a sufficiently steep flow angle to ensure movement of the carbide through the delivery hose) and to keep the welding area reasonably clear of obstructions to maximize the working space. The feed-out mechanism, on the other hand, mimics the travel of the movable arc welding unit so that the particulate being delivered via the feed-out mechanism can be delivered into the molten zone of the arc welding puddle created by the arc welding unit. That sort of travel is usually ensured by affixing the feed-out mechanism to the arc welding unit.

A schematic of a prior art version of such a vibratory carbide hardfacing system 510 (one variant of which is available through Rankin Carbide Automation (Rancho Cucamonga, Calif.)) and is illustrated in FIG. 1 That system 510 includes a vibratory feeder assembly 535, a built-in carbide hopper or bin 532, delivery or drop hose 567, a metering funnel 564, a metering tube 514, and a welding gun 512. A particle feed system 516, swing arm 571, tabletop 580, carbide catch tray 582 and controller 585 are also shown The vibratory feeder assembly 510 is set to oscillate, for example at 70-85 cps (cycles per second) to promote delivery of the carbide to the weld pool. The weld gun 512, when used as part of an automatic process, is able to oscillate at a rate of about 1-5 Hz with an amplitude of about 1-9 mm, creating beads about ⅝ inch-1 inch wide (max 1.5 inches wide). The system is designed to aim the carbide into the trailing side of the arc puddle.

Since the feed-out mechanism in the form of the metering tube 514 is moving and the bin 532 is stationary, that combination results in the delivery hose 567 being fixed at one end and moving quite rapidly at the other, as part of a mass-production hardfacing production process. The delivery or drop hose may be on the order of five feet in length while the metering tube may be on the order of four-inches in length. These dynamics associated with the motion of the delivery hose 567 and the overall length thereof creates a number of challenges. First, harmonics in the delivery tube cause a sloshing effect therein that can cause the delivery tube 514 to wear out fairly quickly. Secondly, the same harmonics/motion makes it much more difficult to control the placement of the carbide/abrasive within the weld puddle and, likewise, to achieve even distribution of the abrasive throughout the finished weld bead. Furthermore, a drop length of at least 4-5 ft. is typically used in order to ensure adequate flow through the delivery hose 567 over the full range of motion of feed-out mechanism (i.e., the angle of the delivery tube 514 must be close enough to vertical to avoid clogging). Because of that large drop length and the density of the carbide particulate, the speed and momentum gained by the carbide/particulate upon impact of the weld puddle can be significant, which can promote carbide and/or weld metal splash, neither of which would promote a good, uniform hardfacing. Finally, because of the difficulty in controlling the placement of the abrasive in the desired location, an undesirable amount of the abrasive can end up on floor and/or otherwise going to waste. Accordingly, the desire is to provide a system that can overcome one or more of those challenges.

BRIEF SUMMARY OF THE INVENTION

In various aspects, the invention provides apparatus and systems and methods for application of hardfacing materials including carbide particles. The apparatus, systems and methods of the invention can allow for production of carbide-containing hardfacings with good incorporation and distribution of wear resistant particles within the hardfacing. Embodiments of the present apparatus, systems and methods in which oscillatory movement of the weld pool is induced may enhance such factors as mixing/distribution of the carbide/particulate material within the weld pool and a reduced opportunity of nucleation of secondary phase materials proximate the added hardfacing material, which can produce surprising beneficial results within the resultant hardfacing microstructure. The apparatus, systems and methods provided can also reduce waste of wear resistant feed particles as compared to conventional apparatus, systems and methods.

In one aspect of the disclosure, an arc welding system includes an arc welding torch, a particulate delivery system, and a movable workpiece holder. In embodiments the arc welding torch is stationary with respect to the workpiece or the speed of movement of the tip of the torch is less than that of the workpiece during a given arc welding pass. It is demonstrated herein that movement of the workpiece while keeping the welding torch and particulate delivery system stationary during a welding pass can increase the number of particles incorporated into the weld pool as compared to a welding pass in which the workpiece is held stationary and the welding torch moved. In an embodiment, oscillatory movement of the workpiece during the welding pass is selected to enhance mixing and/or interrupt the formation of nucleation sites within the weld pool, which essentially slows freezing of the pool. Since there is very short period available (e.g. a fraction of a second) to accommodate the particulate into the weld pool before the pool becomes too viscous and eventually solidifies, the processes of the invention can help maximize the time available to get the desired level of carbide impregnation. In addition, movement of the workpiece during the welding pass can reduce dissolution and/or formation of second phase(s) at the interface of tungsten carbide particles.

In a further embodiment, oscillatory movement of the workpiece while keeping the welding torch stationary or moving the tip of the welding torch at a relatively low speed allows use of high speeds in the welding pass direction. For example, a process speed of about 10-40 in/min, 15-30 in/min, 20-30 in/min or 20-40 in/min can be obtained by moving the workpiece via the moving workpiece holder and using an oscillating motion with an ultimate "forward" motion in the welding pass direction. The efficiencies in getting carbide into the puddle associated with processes of the present invention can produce desirable hardfacings while permitting faster process speeds than those speeds (e.g., 10-12 in/min or less) typically associated with the use of a moving gun/drop tube and stationary sample. In another aspect of the invention, relatively high weld amperages and wire feed speeds are be used in conjunction with relatively high lineal weld process speeds. In an embodiment, the incorporation of relatively large amounts of carbide particles has a greater cooling effect on the weld puddle, which allows use of the relatively high weld amperages and wire feed speeds.

In an embodiment, the invention provides welding system for forming a hardfacing layer on a workpiece, the welding system comprising:
- a) an arc welding head oriented substantially downwardly at an angle conducive for an arc welding operation, the arc welding head being configured to be at least one of stationary and limited to non-oscillatory movement during a given arc welding pass of the arc welding operation;
- b) a particulate delivery system comprising a particulate drop tube and a particulate feed apparatus, the particulate feed apparatus being positionable proximate the particulate drop tube so as to maintain an essentially vertical fluid flow path therebetween during operation of the arc welding head, the particulate delivery system being configured to provide a flow of a particulate via the particulate drop tube to a surface of a workpiece during the given arc welding pass, and the particle drop tube defining a top receiving opening and a bottom delivery opening and being fixed proximate to the arc welding head; and
- c) a movable workpiece holder configured to automatically move the workpiece during operation of the arc welding head, the movement of the workpiece comprising oscillation thereof at a frequency of 1 Hz to 10 Hz.

In an embodiment, the arc welding head, the particulate drop tube, and the particulate feed apparatus are each configured to be at least one of stationary and limited to non-oscillatory movement during a given arc welding pass In a further embodiment, the invention provides a welding system for forming a hardfacing layer on a workpiece, the welding system comprising:
- a) an arc welding head oriented substantially downwardly at an angle conducive for an arc welding operation, the arc welding head being configured to be held stationary or to be limited to movement or articulation in a non-oscillatory manner during a given arc welding pass of the arc welding operation
- b) a particulate delivery system comprising a particulate drop tube fixed proximate to the arc welding head and a particulate feed apparatus, the particulate feed apparatus being positionable proximate the particulate drop tube so as to maintain an essentially vertical fluid flow path therebetween during operation of the arc welding head, the particulate delivery system being configured to provide a flow of a particulate via the particulate drop tube to a surface of a workpiece during the given arc welding pass, the particle drop tube defining a top receiving opening and a bottom delivery opening and being fixed proximate to the arc welding head;
- c) a movable workpiece holder configured to automatically move the workpiece during operation of the arc welding head; the movement of the work, In an embodiment, the arc welding head, the particulate drop tube, and the particulate feed apparatus are each configured to be held in an essentially fixed position or to be limited to non-oscillatory movement during a given arc welding pass. Relatively simple movement of the welding head around a fixed axial system (i.e., essentially not oscillating) and/or along a linear direction can facilitate hardfacing around corners of a part. The particulate delivery apparatus may be moved with the weld held to facilitate particulate delivery to the weld head. In another embodiment, such as when hardfacing around corners of a part, the arc welding head, the particulate drop tube and the particulate feed apparatus may provide simple movement, as discussed above, to facilitate the angles needed. In an embodiment, the arc welding head, the particulate drop tube and the particulate feed apparatus are each configured to be held stationary during a given arc welding pass of the arc welding system.

In a further embodiment the invention provides an arc welding system, comprising:
- a) an arc welding torch configured for forming a molten weld puddle on a workpiece, the arc welding torch being configured for being one of articulated and held stationary during a given arc welding pass;
- b) a particulate drop tube fixed proximate to the arc welding torch;
- c) a particulate feed apparatus configured for providing a flow of a particulate to the particulate drop tube, the particulate feed apparatus further being configured for having at most one degree of freedom during a given arc welding pass and the particulate feed apparatus being configured for maintaining an essentially vertical flow path with the particulate drop tube during a given welding pass; and
- d) a moving workpiece holder configured for moving or articulating a workpiece during the operation of the arc welding torch, the movement comprising oscillation thereof.

In an embodiment, the moving workpiece is configured to automatically move the workpiece during operation of the arc welding torch. In an embodiment, the oscillation is performed at a frequency in the range of 1 Hz to 10 Hz. In an embodiment, the movable workpiece holder is configured to move or otherwise articulate (e.g., provide translational and/or rotational motion) the workpiece during the operation of the arc welding torch. In an embodiment, the workpiece holder is moved or articulated by a workpiece manipulating robotic arm. In an embodiment, the robotic arm provides at least three axes of movement. In an embodiment, the movement or articulation of the workpiece may be achieved, for example, by a robotic arm and head combination enabled with six degrees of freedom (translation in x, y, z directions; rotation about x, y, z axes). In an embodiment, the movable workpiece holder is capable of at maintaining forward or lateral progress in a first direction and oscillating in a second direction other than the first direction. In an embodiment, the movable workpiece holder is capable of maintaining forward or lateral progress in a first direction at a rate of 15 to 30 inches per minute. In an embodiment, the robotic arm provides sufficient axes of movement that corners and surface on different planes can be hardfaced in a single welding process, without having to start and stop the weld bead.

In an embodiment, the arc welding head, the particulate drop tube and the particulate feed apparatus are each configured to be at least one of held in an essentially fixed or stationary position and limited to non-oscillatory movement. In embodiments, movement in a non-oscillatory manner includes linear motion, rotational motion, tilting motion, and combinations thereof. In an embodiment, movement of the welding gun or particulate delivery system components in the primary welding direction or lateral direction is slower than that of the workpiece holder or workpiece. In an embodiment, the tip of the arc welding gun does not move in the primary welding direction during a given weld pass. The ability to move the workpiece can permit the user to always have the portion to be hardfaced in a flat/horizontal position relative the gun/particulate drop combination, thus helping to ensure the weld quality. Primarily moving the sample rather than the welding gun facilitates the process in several ways, including providing for increased travel speeds in the primary welding direction.

In an embodiment, the particulate delivery system is configured for providing a flow of a particulate to the weld puddle. In an embodiment, the particulate delivery system comprises a particulate drop tube and a particulate feed apparatus. In some embodiments, the particulate drop tube is fixed to or fixed proximate to the arc welding head. The particulate drop tube may define a top receiving opening and a bottom delivery opening. In an embodiment, the particulate drop tube is vertically aligned.

In an embodiment, the particulate feed apparatus is configured for providing a flow of a particulate to the particulate drop tube. The particulate feed apparatus may be configured for selectably controlling the amount of particulate to be deposited on a given portion of the workpiece. In a further embodiment the particulate feed apparatus is configured for having at most one degree of freedom during a given arc welding pass (i.e., stationary or simple linear movement), at least during a given arc welding pass of the arc welding operation. As a result, the harmonics/whipping action associated with movement of delivery tube with the welding head in the system illustrated in FIG. 1 is reduced or eliminated. That harmonics/whipping action can cause a sloshing effect in the delivery tube of the prior system, which is known to cause the drop tube to wear out fairly quickly and to make it more difficult to control the placement of the particulate in the weld puddle. Difficulty in controlling placement of the particulate placement can reduce the hardfacing continuity/homogeneity and/or can cause an unwanted amount of the particulate ending up on floor and/or otherwise going to waste.

In an embodiment, the particulate feed apparatus comprises a particle bin (or hopper), a receiver trough, and a vibratory motor or vibrator. In an embodiment, the particulate bin is configured for acting as a source of the particulate during operation of the arc welding head. In an embodiment, the particulate bin comprises an open top and a lower bin out-feed. In an additional embodiment, the particulate bin has an upper portion defining an open end leading to an inwardly sloped lower portion and concluding in an outlet. In a further embodiment, the particulate bin comprises an upper cylindrical portion defining the open top and leading to a downwardly sloped conical portion and concluding in the lower bin out-feed. In an embodiment, the open top is configured for receiving a supply of particulate into the particulate bin and the bin out-feed is directed toward the receiver trough.

In an embodiment, the receiver trough comprises a first or proximate end and a second or distal end, the second or distal end further defining an opening, through which the hardfacing particulate may drop. In an embodiment, the first or proximate is closed to outflow of particulates. In an embodiment, the receiver trough is oriented substantially horizontally. In an embodiment, a trough is oriented from 0 to 10 degrees from a horizontal position. In an embodiment, the trough is oriented such that the distal end of the trough is elevated relative to the proximate end. In embodiments, the trough is angled upwardly between 1 and 10 degrees from the proximate end to the distal end relative to the horizontal x-axis, preferably between 1 and 8 degrees, and more preferably between 2 and 5 degrees.

In an embodiment, the vibratory motor or vibrator assists in selectably controlling the amount of particulate to be deposited. In an embodiment, an air-based vibratory motor or vibrator is used to meter out the flow of the abrasive particulate. In an embodiment, the pneumatic vibrator comprises an air inlet, an air outlet and an outlet valve associated with the air outlet, the outlet valve being configured for controlling a back pressure associated with the pneumatic vibrator. In an embodiment the back pressure improves the functionality of the shaker performance. In an embodiment, the initial air flow startup pressure range of 40-80 psi (pounds per square inch) and more particularly 55-65 psi is overcome by a backpressure setting of 40-85 cfh (cubic feet per hour) and more particularly 60-75 cfh of the ambient air exhaust port. This backpressure setting is then utilized to tune performance and overcome startup pressure but still allowing a reduced vibration in the designed shaker performance. This particular function allows for low harmonic vibration. In an embodiment, the pneumatic vibrator is an air-piston vibrator. In an embodiment, the air-piston vibrator is less than 2.5 inches long.

Use of a pneumatic motor rather than an electric-driven vibratory motor provides several advantages. The employment of the air-driven vibratory motor helps reduce weight of the feed apparatus from approximately 20 lbs. to less than 8 lbs. and even less than 2 lbs. and allows the apparatus to be smaller, lighter, and more compact. Such a smaller light weight particulate feed apparatus can be employed in automated, hand held, tool arm, and fixed applications. The lighter weights due the specific design allows for application in automation by allowing applications in smaller systems with lower end of arm tooling capacities. For example, the feed apparatus may be mounted on a robotic arm. Such mounting on a robotic arm allows the feed apparatus to be automatically translated/transferred between a refill position where the first particulate storage bin can be refilled with particulate and an arc welding position where the hardfacing operation is able to occur or between robotic stations. For fixed applications, a small shaker design weight allows for ease of mounting and greater opportunity of mounting locations due to reduced size and weight. In addition, with the reduction of shaker weight, more carbide particulate can be carried and thus reducing refill frequency and increased run times. Furthermore, it was discovered that use of a pneumatic motor, rather than an electric motor, can provide less variation in the particle delivery rate, thereby promoting a more uniform distribution of carbide in the weld/hardfacing matrix.

In an embodiment, the particulate feed apparatus comprises a particulate bin having an upper portion defining an open end leading to a downwardly sloped lower portion and concluding in an outlet; a receiver trough having a proximate end and a distal end, the trough being substantially horizontally positioned beneath the particulate bin such that the proximate end is under the outlet, the distal end further defining a trough opening; an outfeed tube affixed beneath and to the trough in fluid communication with the trough opening; and a pneumatic vibrator operatively fixed to the receiver trough at an angle of between 10 and 30 degrees. In embodiments, this angle is 11-14 degrees or, 12-22 degrees, relative to the horizontal; and a bracket secured to the particulate bin and configured to maintain the receiver trough in position beneath the particulate bin. In a further embodiment, particles are inserted into the particulate bin upper cylindrical portion; and the pneumatic vibrator facilitates the movement of particles from the particulate bin into the trough, through the opening, and into the outfeed (particulate drop) tube. In an additional embodiment, the bracket is further attached to a movable component for automatically moving the particulate feed apparatus into at least one position. In an embodiment, the movable component is a robotic arm. In a further embodiment, the bracket may be attached to a fixed location (e.g. when the particle feed apparatus remains stationary during a given weld pass).

In an embodiment, the particulate feed apparatus is configured for maintaining an essentially vertical flow path with the particulate drop tube during the given welding pass. One advantage of employing a particulate feed apparatus that maintains vertical alignment with the carbide drop tube, at least during a given welding pass of the arc welding step, is that the feed tube length and the concordant feed bin height can be reduced, down to a foot or less for the particulate drop length. By doing so, the maintenance/operation of the feed bin is simplified and the drop time (from bin release to contact on part) is greatly shortened and easier to control.

Further, the particle delivery system may include a substantially rigid delivery conduit located between the feed system and the particulate drop tube to bridge those two portions, reducing the opportunities for harmonics. When the conduit is made of a substantially rigid material, the chances of clogging due to uneven flow therethrough and/or due to bends forming therein are greatly reduced. The chances of clogging are further reduced when the conduit is short (e.g. a foot or less). In an embodiment, the length of the delivery conduit is greater than zero and less than or equal to 10 inches. A further advantage of a shorter, rigid delivery conduit is that when replacement is needed, the sections of tubing are much shorter and are more accessible. Additionally, there is no need for special support systems like those needed when longer delivery conduits are used. Furthermore, the shorter drop distance is believed to significantly reduce the speed/momentum that the particulate is able gain through the drop length (i.e., less splash/splatter upon impact with the weld puddle). In an embodiment, minimizing the particulate speed/momentum contributes to more even distribution of the particulate/carbide within the hardfacing. Minimizing the speed/momentum of the particulate can also greatly reduce the amount of carbide dust generated, dust that could otherwise get into seals, robotic connections, etc., causing parts other than the delivery system to wear out faster. Thus, this improved carbide/particulate delivery system can contribute to the arc welding machine having more up-time and less maintenance and carbide costs and may simultaneously contribute to an improved hardfacing microstructure.

In an embodiment, particulate delivery system further includes: a delivery element fixed vertically below the open second end of the receiver trough, the delivery element defining an upper end and a lower exit end, the upper end being configured for receiving the flow of particulate from the open second end of the receiver trough, the lower exit end directing the flow of particulate downwardly; and a substantially rigid delivery conduit defining a first conduit end and a second conduit end, the first conduit end being fluidly connected to the lower exit end of the delivery element and the second conduit end being configured for being aligned vertically with the top receiving opening of the particulate drop tube. In an embodiment, the delivery element is a delivery funnel element defining an upper funneling end and a lower exit end, the upper funneling end being configured for receiving the flow of particulate from the open second end of the receiver trough. In another embodiment, the delivery element is an out-feed tube attached to the receiver trough.

Fusion welding processes suitable for use in embodiments of the invention may include GMAW (gas metal arc welding), FCAW (flux cored arc welding), PAW (plasma arc welding), LW (laser welding), GTAW (gas tungsten arc welding) and SAW (submerged arc welding). In an aspect of the invention, the hardfacing materials of the invention are applied to the surface of an article using a GMAW process. The arc welding torch is configured for forming a molten weld puddle. In an embodiment, the arch welding torch is oriented substantially downwardly at an angle conducive for an arc welding operation. In an embodiment, the welding gun angle relative to the horizontal is from 50° to 90°, 60° to 85°, or 70° to 85°. In an embodiment, the height of the contact tip of the welding gun with respect to the workpiece is from 0.5 inches to 0.75 inches. In an embodiment, the arc welding torch is configured to be held stationary during a given arc welding pass. In a further embodiment the arc welding torch is configured to be moved during a given arc welding pass (e.g., simple movement, such as needed for corners/edges, or linear in a weld direction). In an embodiment, use of stationary welding torch reduces the amount of shaking of the welding torch is subject to during the welding process, thus minimizing the concordant imprecisions introduced by such shaking, such as disturbance of process variables (e.g., gun angle and height of welding torch relative to part). In an additional embodiment, the arc welding torch is moved or articulated by a weld-head manipulating robotic arm. In an embodiment, the carbide drop tube is not parallel to the weld gun but is positioned at an angle with respect to the gun. In an embodiment, the angle of the carbide feeder with respect to the horizontal (or workpiece) is 70 to 85 degrees, and the angle of the torch with respect to the horizontal (or workpiece) is greater than the angle of the carbide feeder and less than or equal to 90 degrees. In an embodiment, the outlet of the carbide drop tube is spaced apart from the tip of the wed gun; in an embodiment the spacing is from 0.125 inches to 0.5 inches. The outlet of the carbide drop tube may be placed so that the tip of the weld gun is "ahead" of the outlet of the carbide drop tube.

Gas metal arc welding (GMAW) is an arc welding process which produces coalescence of metals by heating them with an arc between a continuous filler metal (consumable) electrode and the workpiece. Shielding is obtained from an externally supplied gas or gas mixture. Variations of GMAW include short circuit transfer, globular transfer, spray arc transfer and pulsed arc transfer depending on welding parameters and equipment variation. GMAW may use an external shield gas that may be a largely inert gas, such as argon, a mixture of argon and other gases or a reactive gas such as carbon dioxide. The shield gas may comprise an inert gas such as argon and up to 5% oxygen, up to 25% carbon dioxide, or up to 5% oxygen and up to 25% carbon dioxide. For GMAW welding direct current is typically used; the electrode may be either positive or negative. The welding process may be direct current electrode positive (DCEP).

The wire feed speed, voltage and travel speed may change depending on the size and hardness of the hardfacing desired. An increase in wire feed speed and/or travel speed will lower the carbide to weld wire ratio and generally reduce the weld's hardness. In an embodiment, the wire diameter is 0.035 inches to 0.052 inches. In embodiments the wire feed speed is 100 to 500 inches per minute, 100-160 inches per minute, 180 to 400 inches per minute, 300 to 500 inches per minute, or 350 to 400 inches per minute. In embodiments the voltage is 12 to 31 V, 12 to 16 V, 24 to 31 V or 26 to 30 V. Voltage may be raised or lowered to maintain the heat input for other sizes of welds. For example, the voltage may be lowered for smaller weld sizes; the wire feed speed may also be lowered for smaller weld sizes.

In an aspect, this disclosure provides methods for making a hardfacing layers on the metal surface of a part or workpiece in which the workpiece is moved while the arc welding torch are essentially stationary during a given welding pass. For example, the arc welding torch may be essentially stationary if it is not intentionally moved during a welding pass. In an aspect of the invention, the weaving path traced by the part or workpiece is defined by a lateral movement in one direction (e.g. along the centerline of the path) and a simultaneous oscillatory movement in a different direction (e.g. transverse to the centerline of the path). In an embodiment, weaving paths may take any oscillatory pattern or shape, which may include, for example, a straight back and forth motion or a looping form. The pattern could include but is not limited to a sinusoidal waveform (FIG. 2A), triangular waveform, square waveform (FIG. 2B 10$b$), sawtooth waveform, or a looping/circular oscillation (FIG. 3), which could involve a dwell time in some instances. In certain embodiments, the weaving path traced by the part may be periodic. i.e., it may repeat at a given time interval T (and thus have a frequency defined as f=1/T). For example, with reference to FIGS. 2A-2B (path vs time), the direction of lateral movement (i.e., the primary weld process direction) is indicated by the arrow labeled "direction of travel" under the curve, and the weaving path has an amplitude A measured from the centerline to the peak and period T. The overall width of the pattern is twice the amplitude for this type of pattern. In FIG. 3, the looping pattern has a width (W) substantially determined by the size of the loop. In an embodiment, the path can further include a dwell time. Dwell time may be defined as the time the part pauses and maintains its location in at least one direction (e.g., at a peak, valley, and/or center of the path). FIG. 2B, for example, illustrates a dwell time at two peaks of the path. It is to be understood that the pattern/movement could be expressed in the manner of path vs. time (e.g., FIGS. 2A, 2B) or in x-y movement.

In an embodiment, the invention provides a method for making a hardfacing layer on a metal surface of a workpiece, the method comprising the steps of:
 a) welding an iron-based filler metal to the metal surface of the workpiece by gas metal arc welding, thereby generating a weld pool, the filler metal being used as an electrode in a welding gun;
 b) feeding a plurality of carbide particles towards the weld pool with a particulate delivery system;
 c) moving the workpiece with respect to the welding gun the workpiece being moved so as to trace an oscillatory path having a predetermined frequency and amplitude of oscillation.

In an additional embodiment, the invention provides a method for making a hardfacing layer on a metal surface of a workpiece, the method comprising the steps of:
 a) welding an iron-based filler metal to the metal surface of the workpiece by gas metal arc welding, thereby generating a weld pool, the filler metal being used as an electrode in a welding gun;
 b) feeding a plurality of carbide particles towards the weld pool with a particulate delivery system;
 c) moving the workpiece with respect to the welding gun the workpiece being moved so as to trace an oscillatory weaving path having a predetermined frequency and amplitude of oscillation;
wherein at least one of the workpiece and the welding gun is moved at a lateral travel speed defined along the primary weld direction. In an embodiment, the oscillatory weaving path is such that workpiece is moved at a lateral travel speed along the primary weld direction. In a further embodiment, the weld gun is moved at a lateral travel speed along the primary weld direction with the movement of the weld gun being non-oscillatory in nature. In an additional embodiment, the particle delivery system is moved with the weld gun.

In an embodiment the invention provides a method for making a hardfacing layer on a metal surface of a workpiece, the method comprising the steps of: a) welding an iron-based filler metal to the metal surface of the workpiece by gas metal arc welding (often abbreviated as GMAW), thereby generating a weld pool, the filler metal being used as an electrode in a welding gun; b) feeding a plurality of carbide particles towards the weld pool with a particulate delivery system; and c) moving the workpiece with respect to the welding gun, the workpiece being moved so as to trace an oscillatory path having a primary weld path direction, a frequency of oscillation, and an amplitude of oscillation measured, for example, perpendicular and/or parallel to the primary weld path direction, the workpiece being generally moved at a lateral travel speed defined along the primary weld path direction. In an embodiment, the welding gun and particulate delivery system are maintained stationary in steps a) and b) while moving the workpiece with respect to the welding gun. In an embodiment the welding gun and particulate delivery system are limited to at most simple, non-oscillatory movement in steps a) and b) while moving the workpiece with respect to the welding gun. In an embodiment the oscillation path defines a path centerline, the path centerline extends parallel to the primary path direction, and the amplitude is specifically measured from the path centerline to a peak of the path.

In an embodiment, the lateral travel speed is from 10 ipm (inches per minute) to 40 ipm, at least 12 ipm, at least 15 ipm, or at least 18 ipm. In embodiments, the frequency of the oscillation of the weaving path is from 1 Hz to 10 Hz, from 2 Hz to 10 Hz, from 4 Hz to 10 Hz, from 5 Hz to 10 Hz, from 6 Hz to 10 Hz, at least 2 Hz, at least 4 Hz, at least 5 Hz, or at least 6 Hz. In embodiments, the amplitude of the weaving path is from 1 mm to 15 mm, 1 mm to 10 mm, 1 mm to 9 mm, 1 mm to 8 mm, 0.25 mm to 10 mm, 0.25 mm to 8 mm, 2 mm to 10 mm, or 5 mm to 10 mm. In an embodiment, no dwell time is used. In further embodiments, the dwell time is greater than zero and less than or equal to 0.01 sec, greater than zero and less than or equal to 0.02 sec, greater than zero and less than or equal to 0.05 sec, greater than zero and less than or equal to 0.1 sec, greater than zero and less than or equal to 0.15 sec or greater than zero and less than or equal to 0.2 sec. The dwell time may occur at each peak of the path. In embodiments, the drop rate of the particles is from 0.5 to 9 g/sec, 0.5 to 5 g/sec and 2 to 5 g/sec.

In an embodiment, the iron-based filler metal is a low carbon steel, such as ER70S-6 (L59) or ER90S-D2 (LA 90). In an embodiment, the particulate material is a wear resistant material, such as a carbide material. Carbide materials include, but are not limited to, tungsten carbide, silicon carbide, boron carbide, and combinations thereof. In an embodiment, the volume percentage of tungsten carbide particles in the feed is from 10% to 50%, with silicon carbide and/or boron carbide particles forming the balance. If blends of carbide materials are used, a separate particle feeding system may be used for each type of carbide material. In another embodiment, the particles may be provided as a mix within a single dispenser.

In an embodiment, the volume fraction occupied by non-dissolving wear resistant particles (e.g., higher melting carbide particles such as tungsten carbide) in the hardfacing layer is from 15% to 50%, 30% to 70% or from 30 to 50%. In an embodiment the area fraction occupied by the non-dissolving wear resistant particles in a cross-section of the hardfacing layer is from 15%-50% and, more particularly, 35-45%. It is to be understood that, when using lower melting carbides such as SiC and $B_4C$, such materials will dissolve into the matrix, with some iron carbides precipitating out as part of the process. When using such materials, the hardness and weight achieved may be a better parameter by which to judge the effectiveness of the hardfacing.

The advantages and features which characterize the invention are pointed out with particularity in the claims annexed hereto and forming a part hereof. For a better understanding of the invention, however, reference should also be had to the drawings which form a part hereof and to the accompanying descriptive matter, in which are illustrated and described various embodiments of the invention. Further a variety of additional aspects are set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

FIG. 1 is a side, partial cut-away view of a prior art system for delivering a particulate to an arc welding torch FIG. 2A illustrates a waveform generally in the form of a sine wave, while FIG. 2B illustrates a waveform generally in the form of a square wave.

FIG. 8A shows another embodiment of a particle feed apparatus, while

FIG. 10A: stationary sample, moving arc welding head. FIG. 10B: moving sample, stationary arc welding head.

FIG. 11A: stationary sample, moving arc welding head. FIG. 11B: moving sample, stationary arc welding head.

DETAILED DESCRIPTION OF THE INVENTION

Figure 2A:
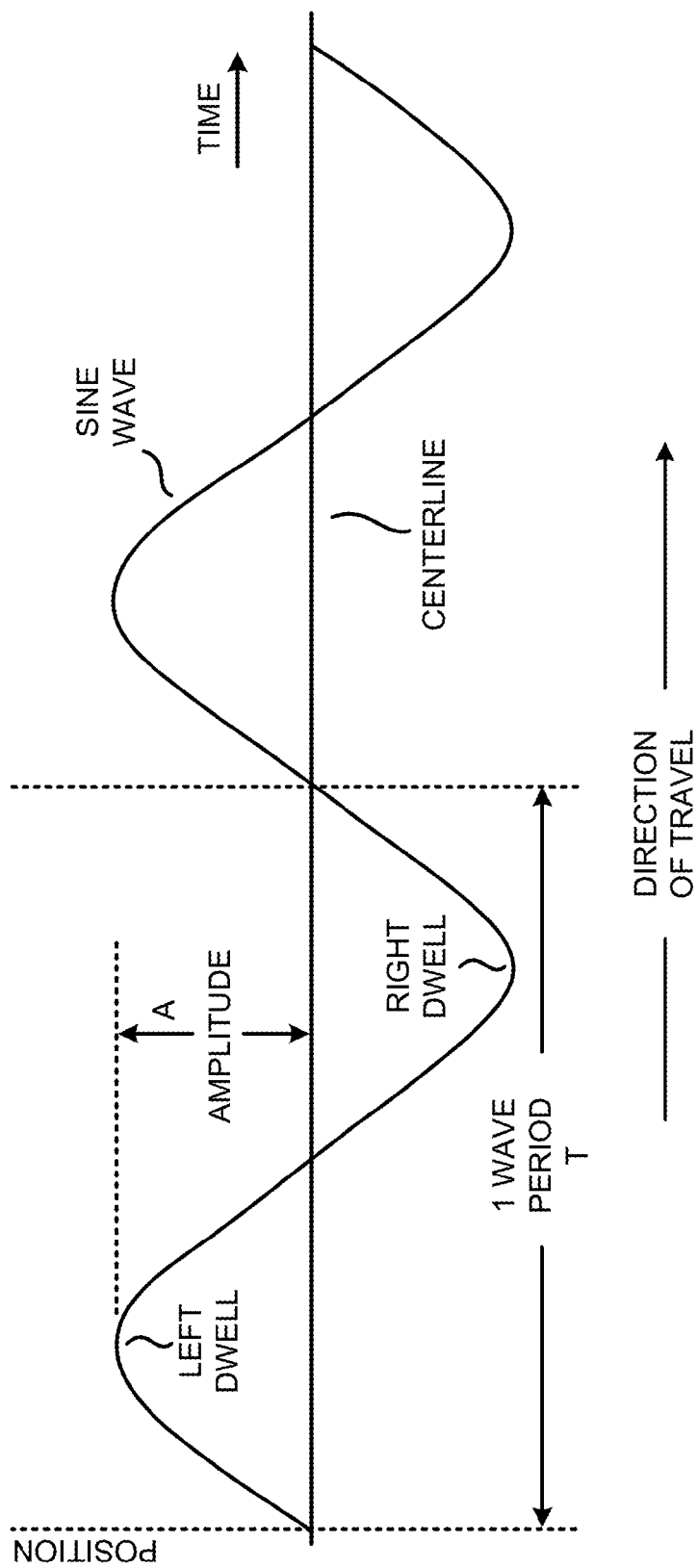
FIGS. 2A and 2B illustrate exemplary oscillatory waveforms in terms of path versus time.
Figure 2B:
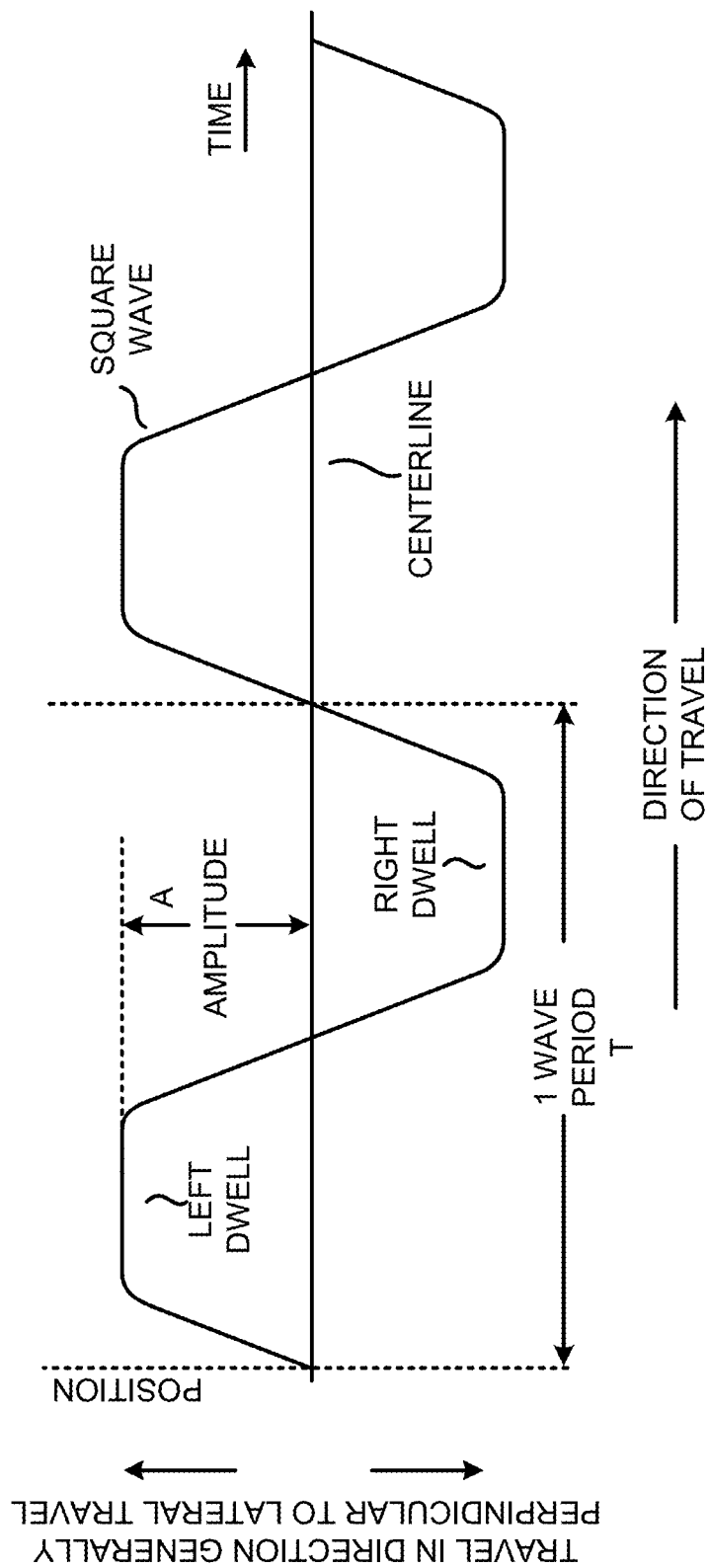
Figure 3:
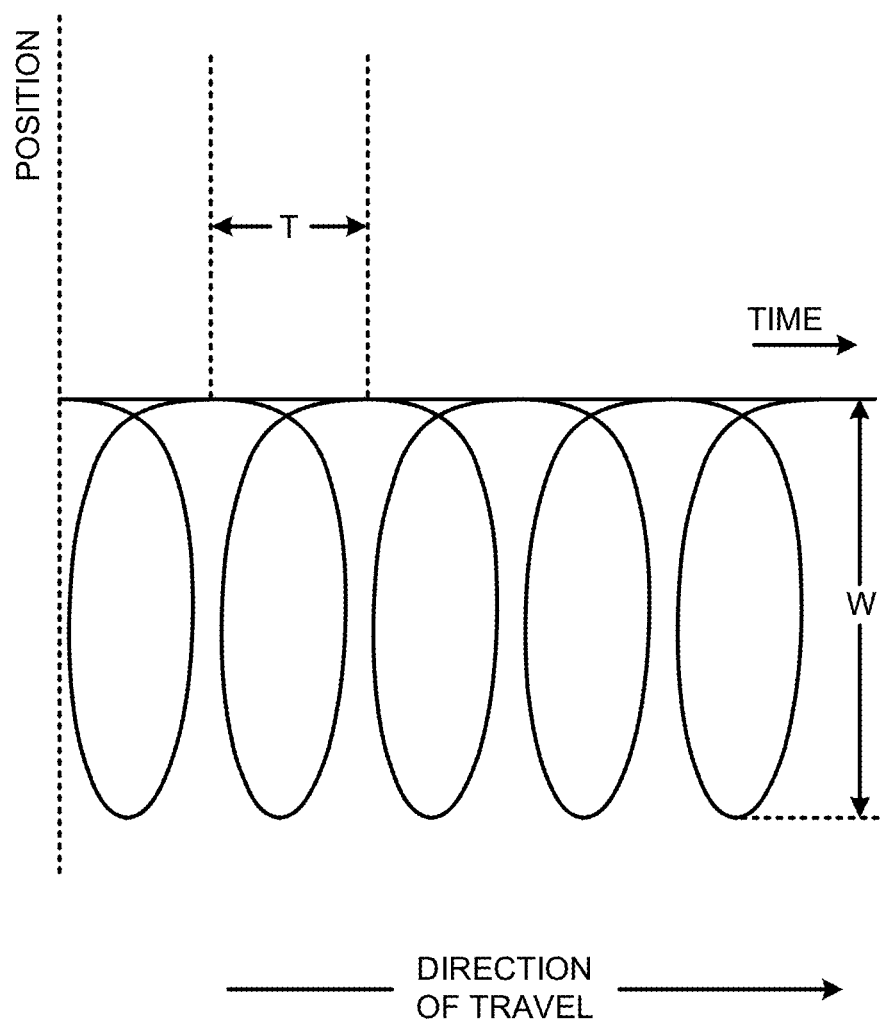
FIG. 3 illustrates a looping oscillatory waveform in terms of path versus time.
Figure 4:
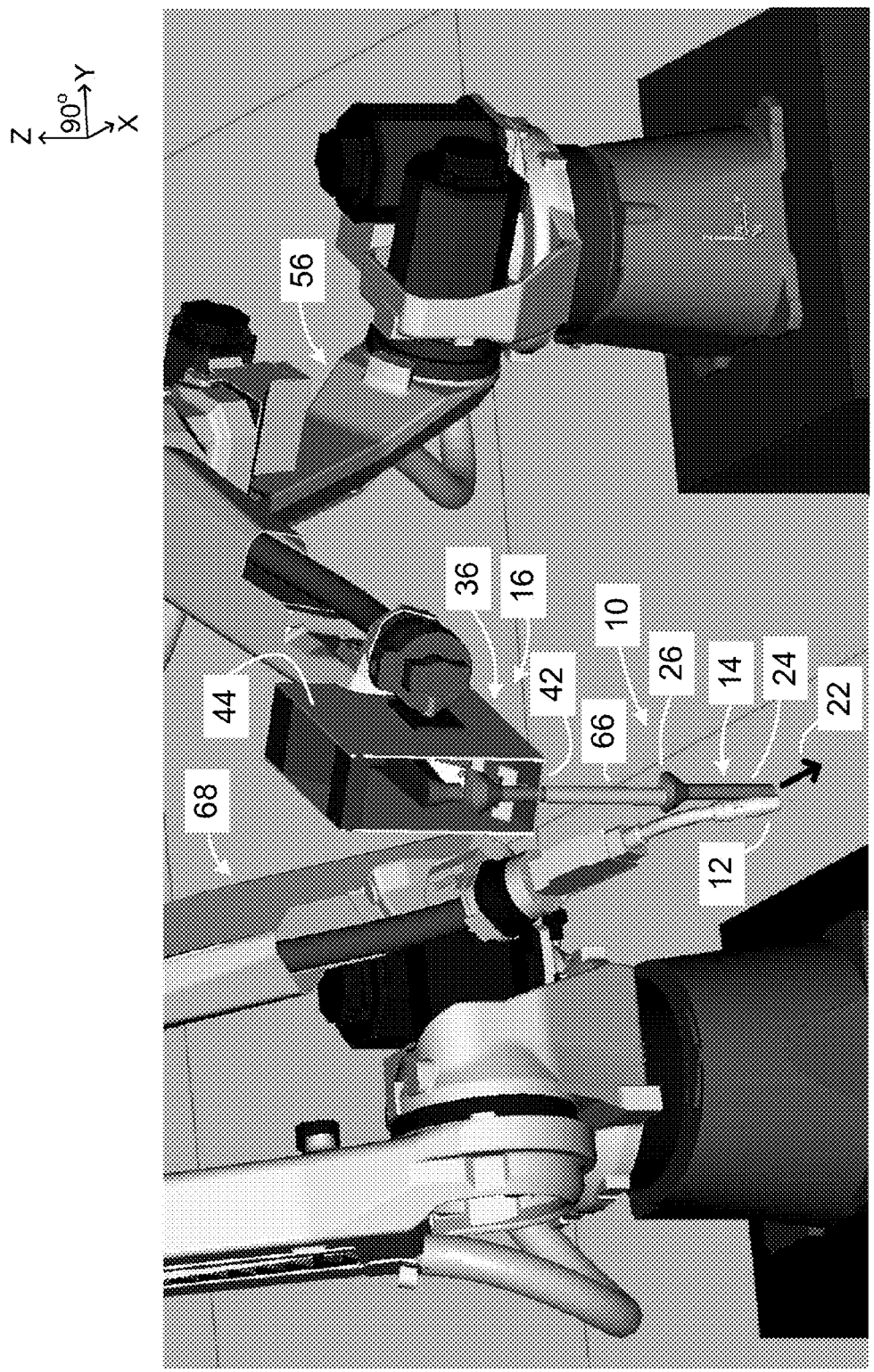
FIG. 4 is a front isometric view of an embodiment of the present hardfacing system including a mechanism for delivering a particulate (e.g., a carbide) and an arc welding torch (without the movable workpiece holder being shown).
Figure 5:
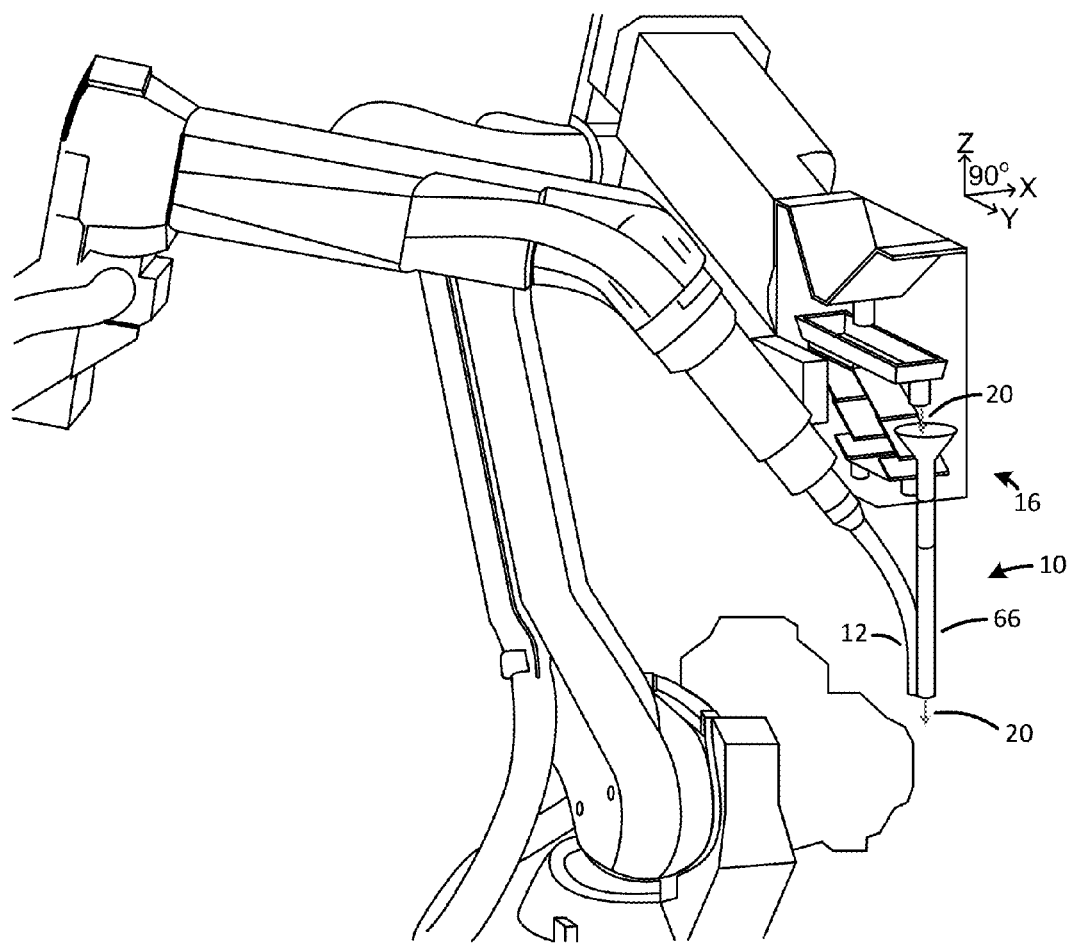
FIG. 5 is a front isometric, close-up view of the arc welding torch and particulate delivery system of FIG. 4, with most of the walls of the particulate delivery system not shown to facilitate viewing of the interior thereof.
Figure 6:
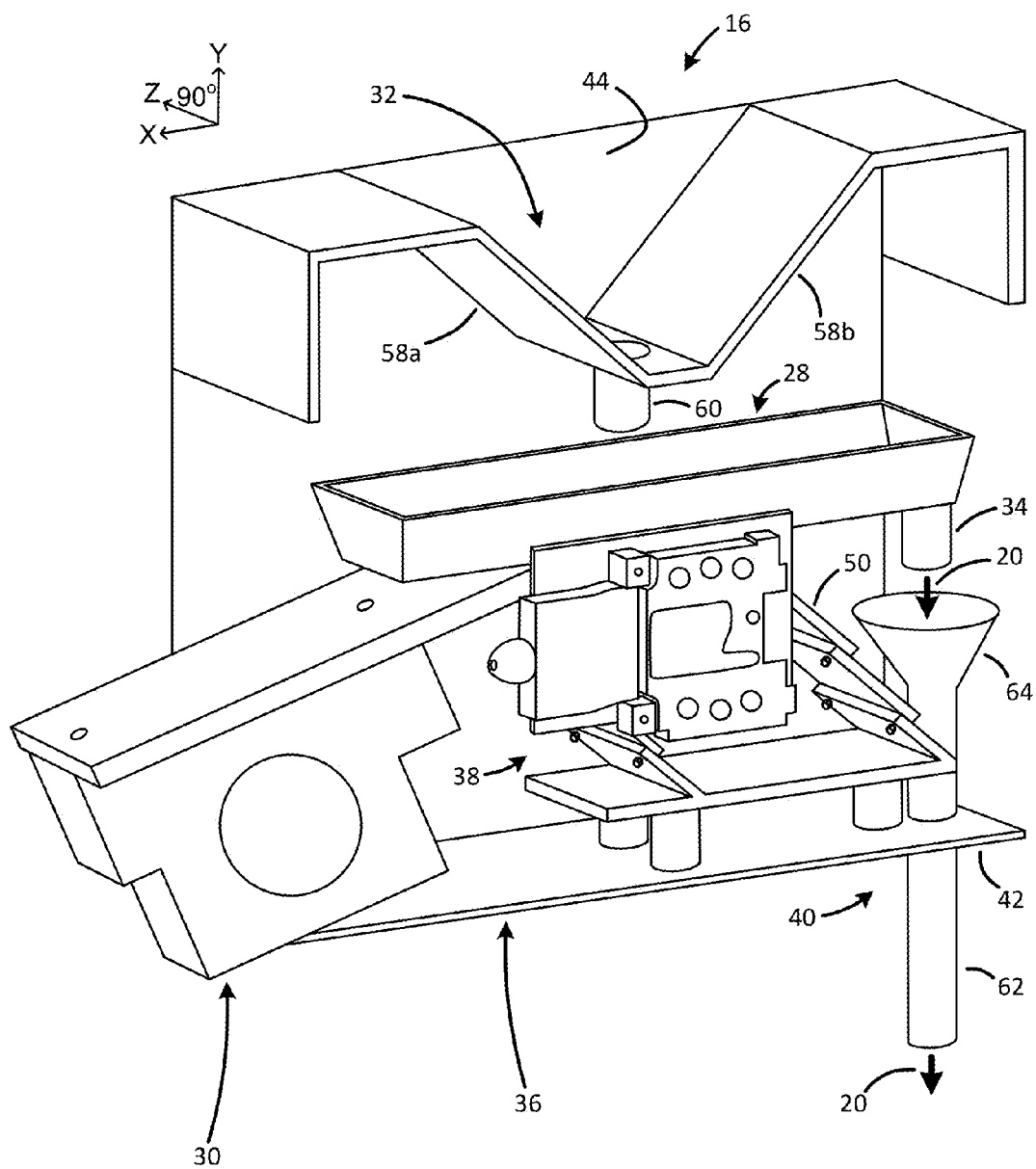
FIG. 6 is a front isometric view of the particulate delivery system of FIG. 5, with most of the walls of the particulate delivery system not shown to facilitate viewing of the interior thereof.
Figure 7A:
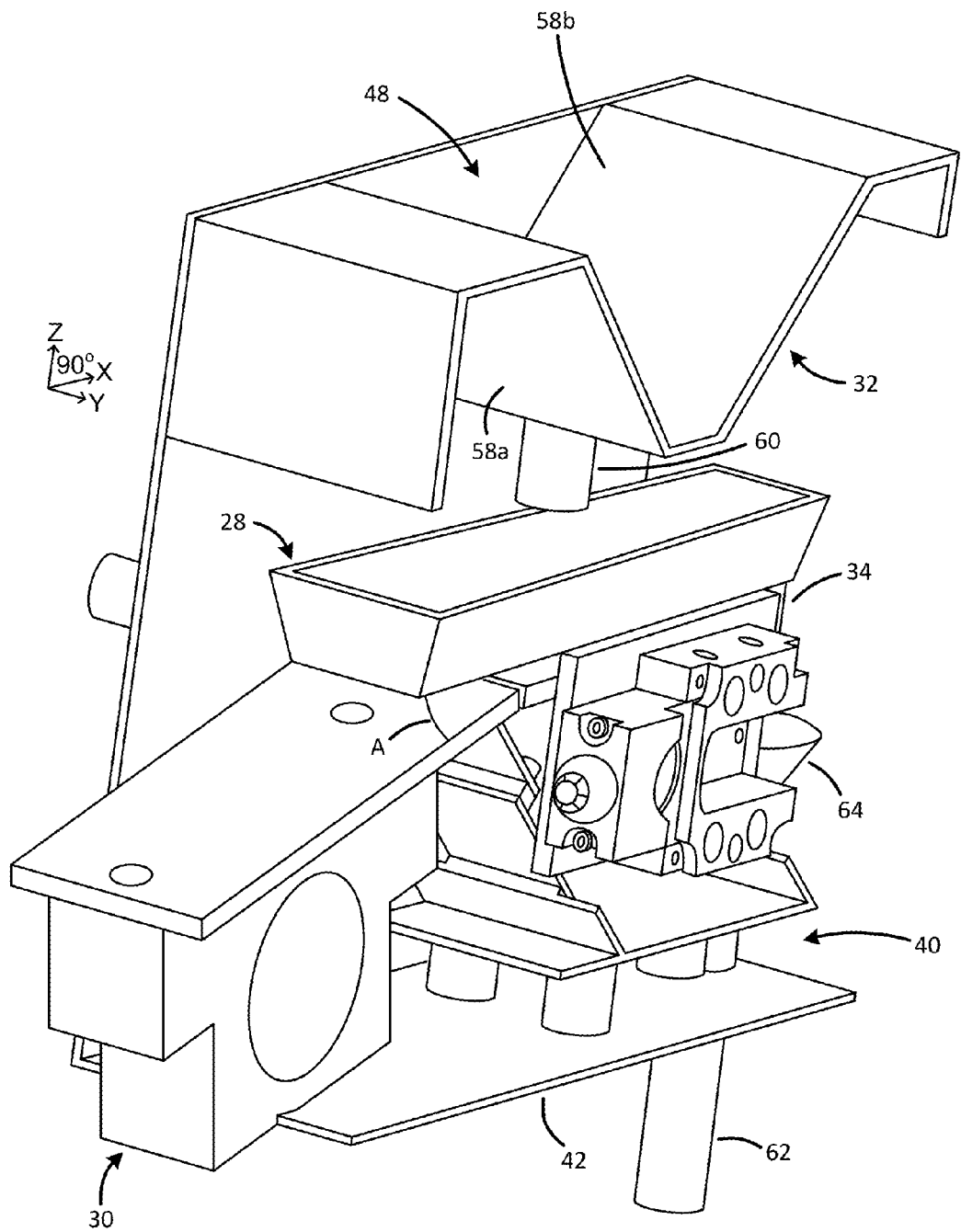
FIG. 7A is front, slightly angled isometric view of the particulate delivery system shown in FIG. 6.
Figure 7B:
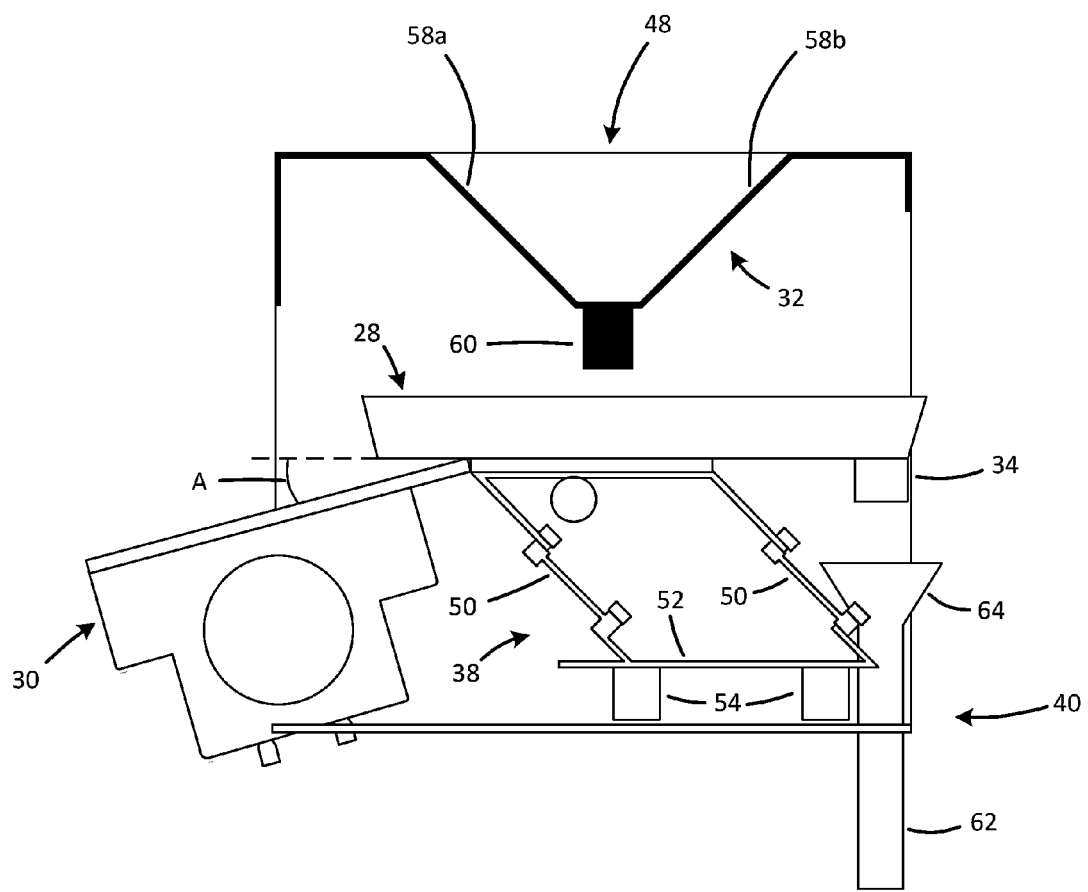
FIG. 7B is a front view of the particulate delivery system shown in FIG. 6, shown without the pneumatic port plate to facilitate the view of the internal mounting structure.
Figure 9A:
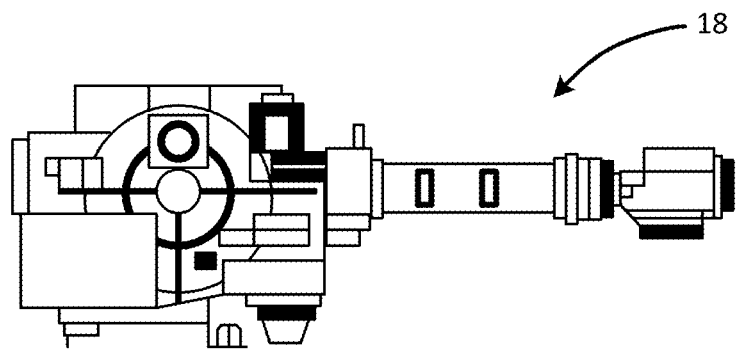
FIG. 9A is a top view of a workpiece articulating robot, usable as part of the present system for delivering a particulate shown in FIGS. 4, 5, 8A and 8B.
Figure 9B:
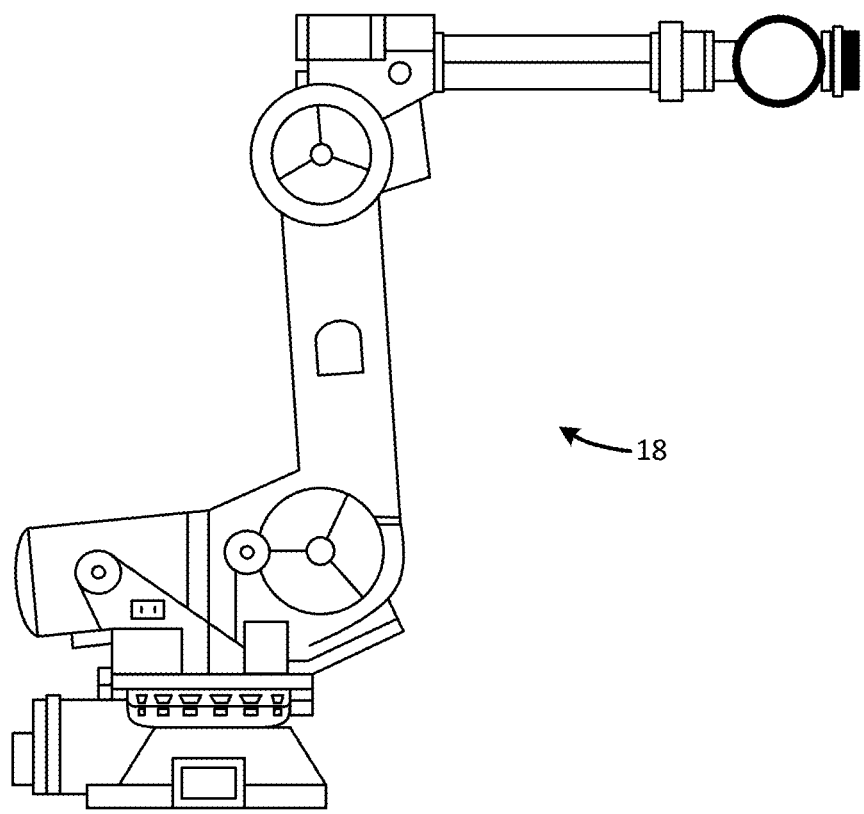
FIG. 9B is a side view of the workpiece articulating robot shown in FIG. 9A.

In one embodiment of the present system, an arc welding hardfacing system 10, as illustrated in FIGS. 4 and 5, includes an arc welding torch/head 12, a particulate drop tube 14, a particulate feed apparatus 16, and a movable workpiece holder 18. The arc welding torch 12 is configured for forming a molten weld puddle (not shown) and further is configured for being one of articulated and held stationary during a given arc welding pass (not shown). If articulated, the movement, in one embodiment, would be non-oscillating in nature, for example, providing simple rotation, such as needed to work around a corner/edge, or straight-line motion. The particulate drop tube 14, per the embodiment of FIGS. 4 and 5, is fixed proximate to the arc welding torch 12. The particulate feed apparatus 16 is configured for providing a flow of a particulate (not shown) to the weld puddle (e.g., as needed to create a hardfacing on a given workpiece (not shown)), via the particulate drop tube 14. Further, the particulate feed apparatus 16 is configured for having at most one degree of freedom during a given arc welding pass and is configured for maintaining an essentially vertical flow path 20 with the particulate drop tube 14 during the given welding pass. The moving workpiece holder 18 (FIGS. 9A, 9B) is configured for articulating the workpiece (not shown) during the operation of the arc welding torch 12. In an embodiment, the particulate being delivered and channeled by the particulate feed apparatus 16 and the particulate drop tube 14 is comprised of an abrasive and/or high-hardness material, such as tungsten carbide, silicon carbide, boron carbide, another similar ceramic material, or some combination of such materials, used to improve the wear characteristics and/or abrasive nature of the hardfaced portion of the given workpiece. However, in further embodiments the particulate could be comprised of another type of material and/or be deposited in the weld for other purposes (e.g., as a reinforcement agent) and still be within the scope of the present system.

In an embodiment, the arc welding head 12 (also known as a welding gun or torch) is oriented substantially downwardly at an angle conducive for an arc welding operation, as is known in the art of arc welding and/or hardfacing. In embodiments, the arc welding head 12 is configured for being one of held stationary and permitted to articulate at least during a given arc welding pass of the arc welding operation. In a first embodiment, the arc welding head 12 is held stationary at least during a given welding pass, with the desired motion being supplied entirely by the movable workpiece holder 18.

In a variation, the arc welding head 12 is restrained, for example, to an essentially linear motion along the welding pass direction 22 and/or to simple rotational movement (such as desired for negotiating corners and/or edges), with the oscillating pattern being achieved through the articulation of the workpiece by moving the workpiece holder 18. Limiting the complexity/rapidity of motion of the arc welding head 12 can help to decrease the opportunity for particulate displacement to areas outside of the hardfacing bead (e.g., due to splashing out of puddle and/or drop momentum carrying particles outside the bead zone) and to increase the accuracy and/or precision of the particulate deposition within a given hardfacing weld bead. In another variation, the arc welding head 12 in that instance moves primarily in the welding pass direction 22 with limited movement obliquely thereto to facilitate the oscillating pattern. The arc welding head 12 defines a welding gun angle (not labeled) and a welding gun height (not labeled) relative to the horizontal or to the workpiece during use of the welding gun. The welding gun/head 12 is configured for at least one of defining a fixed welding gun angle and a fixed welding gun height during use thereof and for adjusting at least one of the welding angle and the welding gun height, as is known in the art of robotic arc welding.

In yet a further variation (not illustrated), when the arc welding head 12 is robotically mobile and carries the particulate drop tube 14, the arc welding head 12/particulate drop tube 14 combination may be articulated to a separate cleaning station (not shown). At such a cleaning station, the arc welding head 12 and/or the particulate drop tube 14 may have unwanted metal, oxide, and/or flux deposits removed therefrom. That cleaning could, for example, take the form of an abrasive reaming of the interior and/or exterior of the arc welding head 12 and/or the particulate drop tube 14, soaking in a chemical bath, etc., or some combination thereof. In an embodiment, automation of the cleaning step reduces downtime and/or facilitates a more regular cleaning regimen.

In an embodiment, the particulate drop tube 14 (as shown in FIG. 4) is fixedly attached to the arc welding head 12. In an embodiment, the drop tube 14 is part of a vertical flow path 20 and is configured and oriented to guide the particulate flow, originating from the particulate feed apparatus (e.g. 16 or 100), toward a given weld puddle of a hardfacing bead. (The present system is discussed primarily in context of forming a hardfacing bead, but the system could also be potentially used to form a more generic particulate-infused weld or other fused-metal bead and still be within the scope of the present system.) In an embodiment, the drop tube 14 includes a drop tube channel 24 and a drop tube funnel 26. The drop tube funnel 26 is oriented at the top of the drop tube channel 24 (relative to the vertical flow path 20). The drop tube funnel 26 is configured to receive the flow of particulate from the particulate feed apparatus 16.

The drop tube funnel 26 has a funnel entry diameter 28, and that funnel entry diameter 28 establishes the distance that the arc welding head 12 and the particulate feed apparatus 16 can potentially move out of sync with one another (e.g., laterally away from). That is, moving the particulate drop line associated with the particulate feed apparatus beyond the funnel entry diameter 28 may result in the loss and/or misdirection of particulate. In an embodiment, the welding head 12 speed in the welding pass direction essentially matches that of the particulate feed apparatus 16 to maintain the desired particulate flow through the drop tube funnel 26 (e.g., if the particulate feed apparatus 16 is fixed during welding, the welding head 12 does not move substantially in the welding pass direction).

The particulate feed apparatus 16 (one variant of which is best seen in FIG. 5, FIG. 6, and FIGS. 7A and 7B) may also be known as a particulate or carbide shaker. In an embodiment, the particulate feed apparatus 16 generally includes a receiver trough 28, an air-driven/pneumatic vibrator 30, a first particulate bin 32, a trough outlet 34, a feed apparatus enclosure 36, a trough and vibrator mount system 38, and a particulate feed exit tube 40. In an embodiment, the feed apparatus enclosure 36 includes a bottom support wall 42 and two vertical side walls 44 (FIG. 4) and may further include two vertical end walls (not shown) which would respectively extend between the vertical side walls 44 and upwardly from the bottom support wall 42, effectively boxing in/enclosing the working portions of the particulate feed apparatus 16.

In an embodiment, the feed apparatus enclosure 36 further defines an open top portion 48, the open top portion 48 facilitating filling/refilling of the first particulate bin 32 with a desired particulate material. In an embodiment, the receiver trough 28 is mounted (as seen per the x-y-z axis system in FIG. 6) via the trough and vibrator mount system 38 so as be generally horizontal relative to the bottom support wall 42 of the feed apparatus enclosure 36 and positioned below the first particulate bin 32. By being held generally horizontal to the bottom support wall 42 and, potentially, being held at a slight upward angle (e.g., 1-10 degrees) toward the trough outlet 34 (as discussed previously), any particulate held within the receiver trough 28 will generally tend to remain therein unless the receiver trough 28 is moved (e.g., shaken as by the air-driven vibrator 30) or is overfilled (e.g., causing premature escape through the trough outlet 34 or over the sides (not labeled) of the receiver trough 28).

The horizontal mounting of the receiver trough 28 and use of the air-driven vibrator 30 together facilitate the creation of a metered flow of the particulate out through the trough outlet 34. The air-driven vibrator 30, powered by an air/pneumatic infeed (e.g., in the form of a pneumatic/air hose) (not shown), may be mounted at a trough-vibrator angle A of 10-25 degrees relative to the receiver trough 28 and, more particularly, at a trough-vibrator angle A for this variant of about 11-14 degrees, for this variant. The trough-vibrator angle A and the use of the air-driven vibrator 30 tend to promote an even and controllable flow of particulate material to and out of the trough outlet 34.

Besides being highly controllable, the air-driven vibrator 30 offers the advantage of being much lighter in weight than an electric vibrator (such as that used in the prior art design of FIG. 1) helping reduce the weight of the overall system from about 20 lbs. to about 7 lbs., for the embodiment illustrated in FIGS. 5-7B. The reduced weight of the system facilitates its mounting on a robotic arm (i.e., a weight of 20 lbs. is not conducive to carrying by currently-available robotic arms, especially once the weight of the carbide is factored in) and decreases the inertia associated with the particulate feed apparatus 16. The inertial decrease makes it easier to stop/start and otherwise accurately position the particulate feed apparatus 16 (e.g., relative to the arc welding torch 12 or to a fill station (not shown)), should the particulate feed system 16 be designed to be moved. For one, the ability to create a controlled and metered flow of particulate out through the trough outlet 34 ultimately permits, for example, a different amount of particulate/carbide to be applied to different faces of a given part or possibly even to different portions of a given face thereof. It is to be understood, however, that any vibrational system that could meet the weight requirements and/or the flow control aspects set forth above may be within the scope of the particulate feed system for the present system.

As elsewhere previously discussed, in some embodiments the particulate feed system 16 is configured to remain permanently stationary or to be stationary during operation of the arc welding torch 12 (i.e., able to move to a refill station (not shown) while no hardfacing/welding is occurring); or be able to be moved in a simple, non-oscillatory manner (e.g., rotated, such as to aid in hardfacing of a corner or edge, and/or conveyed in a welding pass direction). A stationary position for the particulate feed system is possible, for example, if the movement in the welding pass direction is supplied entirely by the moving workpiece holder 18, as is contemplated in an embodiment of the present system. When the connection between the particulate feed system and the drop tube is rigid rather than flexible, the particulate feed system 16 would expect to be movable to the same degree as the arc welding torch 12. In an embodiment, the particulate feed system 16 is limited to at most simple, non-oscillatory movement (e.g., simple rotational and/or linear), at least during a given arc welding pass of the arc welding operation. As a result, the harmonics/whipping action associated with delivery tube of the previously employed system is greatly reduced or eliminated. The simplified particulate drop dynamics associated with the present particulate feed system 16 also may reduce the wear associated with a number of parts of the arc welding hardfacing system 10 and/or may aid in the accuracy and precision of the particulate delivery into a given weld puddle.

As illustrated best in FIG. 5, FIG. 6, and FIGS. 7A and 7B, the trough and vibrator mount system 38, in the embodiment illustrated, includes a pair of angled mount plates 50, a horizontal base plate 52, and a plurality of dampening fixtures 54. The angled mount plates 50 are essentially parallel to one another but an angle to both of the receiver trough 28 and the horizontal base plate 52 and are preferably formed of sufficiently flexible material to facilitate the shaking of the receiver trough 28 yet rigid enough to support the same. Thus, the angled mount plates 50 could also be considered flexure plates. It is to be considered that the angled mount plates 50 could each be made of one or more elements (e.g., three portions (not individually labeled) in the illustrated embodiment), as needed to facilitate mounting and/or flexure.

In the embodiment illustrated, the plate-to-trough angle (not labelled) of the angled mount plates 50, relative to the receiver trough 28 and opening toward the trough outlet 34, is about 40-55 degrees, and the plate-to-vibrator angle (not labelled) is in the range of about 110-130 (more particularly about 120 degrees). Such an angular arrangement (e.g., one or both angles) may be employed in order to aid the shaking of the particulate toward the trough outlet 34 during operation of the air-driven vibrator 30. The plate-to-trough angle and/or the plate-to-vibrator angle may be chosen further to facilitate easy and near-instantaneous flow of particulate out of the trough outlet 34 upon start-up of the air-driven vibrator 30 (e.g., minimal inertia associated with starting/stopping particulate flow with the present configuration).

In the embodiment illustrated, the dampening fixtures 54 and the horizontal base plate 52 help maintain the receiver trough 28 essentially level to the bottom support wall 42 of the feed apparatus enclosure 36, thus not promoting particulate flow toward the trough outlet 34 when the air-driven vibrator 30 is off. The dampening fixtures 54 also absorb vibration, thereby helping to minimize the amount of vibrational energy that is transferred to the feed apparatus enclosure 36 and, thus by extension, to a feed-apparatus-carrying robotic arm 56 attached to the feed apparatus enclosure 36. While a representative trough and vibrator mount system 38 has been illustrated and described, it is to be understood that any mount system that helps promote the desired particulate flow within the receiver trough 28 and that generally limits the translation of vibratory energy to the feed apparatus enclosure 36 and the feed-apparatus-carrying robotic arm 56 would likely be sufficient and thus would be considered within the present scope.

In the embodiment illustrated, the first particulate bin 32 includes, in part, two oppositely slanted bin walls 58 a, b, and a bin out-feed 60. The first particulate bin 32 is further defined, in part, by a respective portion of the vertical side walls 44 of the feed apparatus enclosure 36. The oppositely slanted bin walls 58 a, b are further away from one another near the open top portion 48 of the feed apparatus enclosure 36 and closer to one another nearing the bin out-feed 60. As such, the first particulate bin 32 facilitates easy filling thereof and also helps to channel flow of the particulate therein toward the bin out-feed 60. The bin out-feed 60 is positioned directly above the receiver trough 28 to facilitate efficient transfer of particulate material thereto. The bin out-feed 60 is illustrated as being generally centrally located relative to the length of the receiver trough 28, which promotes even distribution of particulate within the receiver trough 28 while not placing the particulate too close to the bin out-feed 60 to begin with. It is advantageous not to place the particulate too close to the bin out-feed 60 to start, as such placement could adversely affect the metered outflow of particulate via the particulate feed apparatus 16, if it were to happen.

In an embodiment, the particulate feed exit tube 40 is generally vertically aligned within the vertical flow path 20 for the particulate and positioned below the trough outlet 34, where the vertical flow path 20, indeed, begins. The particulate feed exit tube 40, as illustrated, extends through the bottom support wall 42 and is fixedly mounted thereto. However, it is to be understood that any mounting arrangement that would permit the particulate feed exit tube 40 to be generally vertically mounted relative to the feed apparatus enclosure 36 so as to receive the particulate flow from the trough outlet 34 and to deliver that flow beyond the confines of the feed apparatus enclosure 36 would be within the scope of the present system. In an embodiment, the particulate feed exit tube 40 includes an exit tube channel 62 and an exit tube funnel 64, the exit tube funnel 64 being positioned to receive the incoming particulate from the trough outlet 34. The provision of the exit tube funnel 64 helps minimize any particulate losses in the transfer between the trough outlet 34 and the particulate feed exit tube 40 and accommodates the shaking displacement range for the dropping particulate, as initiated by the air-vibrator induced motion in the receiver trough 28.

In an embodiment, an intermediate delivery conduit 66 is provided that extends (separately or integrally) generally vertically from the exit tube channel 62, opposite the exit tube funnel 64, and is directed toward the drop tube funnel 26 of the particulate drop tube 14. The delivery conduit 66 helps contain the flow of the particulate through the vertical flow path 20 thereof, thereby minimizing the chances for loss of the particulate during particulate movement between the exit tube channel 62 and the drop tube funnel 26. Alternatively, the exit tube channel 62 can be made be longer, obviating the need for the intermediate delivery conduit 66. Likewise, the trough outlet 34 and the exit tube channel 62 can be consolidated into a single part.

The delivery conduit 66 and the exit tube channel 62, at least, are preferably made of a stiff, wear-resistant material such as a plastic, a wear-resistant alloy or metal, or a ceramic. The stiffness reduces the opportunities for harmonics/sloshing to be generated as any particulate flows therethrough, thus promoting efficient and controllable material flow therein. The wear resistance promotes a longer part lifetime, saving in both maintenance time and costs.

Further, the combined length of the delivery conduit 66 and the exit tube channel 62 that extends below the feed apparatus enclosure 36 is preferably about 12 inches or less, with the delivery conduit 66 being about 10 inches or less in length. More preferably, that combined length is less than about 7 inches. As may be suggested by FIG. 5, it may be possible to eliminate the particulate drop tube 14 and to use the delivery conduit 66 to direct the particulate into the weld zone. Such a modification is considered to be within the scope of the present system (i.e., the particulate drop tube 14 and/or the delivery conduit 66 can be used to direct the particulate beyond the particulate feed system 16 and into the weld zone/puddle). In an embodiment, a particulate drop tube 14 is provided separate and apart from the rest of the particulate drop conduit (whatever form and number of parts that includes) leading from the trough 28, given that the particulate drop tube 14 may very well be subjected to clogging, erosion, wear, oxidation, etc., due to its proximity to the weld area, thus being a portion one could expect to need periodic replacement. As such, that smaller section could be replaced/repaired as required.

In an embodiment, robotic motion control can be used to position any or all of the workpiece, the arc welding head 12, and the particulate feed system 16. As previously indicated, the workpiece may be manipulated by the moving workpiece holder 18 (e.g., a HS-G3 series handling robot from Panasonic Robotics). The moving workpiece holder 18 is preferably capable of providing a full range of motion (e.g., XYZ; pitch/yaw/roll), thereby possibly permitting the arc welding head 12 and the particulate feed system 16 to remain stationary at least during the operation of the arc welding head 12.

In a further embodiment, the arc welding head 12 is articulated by a weld-head manipulating robotic arm 68, and the particulate feed system 16 is articulated by a feed-system manipulating robotic arm 70. In yet a further variation (not illustrated), when the arc welding head 12 is robotically mobile and carries the particulate drop tube 14, it may be possible that the arc welding head 12/particulate drop tube 14 combination could be articulated to a separate cleaning station (not shown). At such a cleaning station, the arc welding head 12 and/or the particulate drop tube 14 could have unwanted metal, oxide, and/or flux deposits removed therefrom. That cleaning could, for example, take the form of an abrasive reaming of the interior and/or exterior of the arc welding head 12 and/or the particulate drop tube 14, soaking in a chemical bath, etc., or some combination thereof. Automation of the cleaning step could help reduce downtime and/or facilitate a more regular cleaning regimen.

In an embodiment, a lateral travel speed in the weld pass direction of about 10-40 ipm (inches/min), 15-40 ipm, 18-30 ipm, at least 12 ipm, at least 15 ipm, and at least 18 ipm can be achieved (as a benchmark, 18 ipm is at least 2× faster than in some currently available systems) by moving the workpiece via the moving workpiece holder 18 and using a generally sewing-machine style motion (i.e., weaving/oscillating yet with ultimate forward motion) to do so. The motion of the moving workpiece holder 18 is readily controllable, and the inefficiencies associated with the sloshing motion of the delivery tube that are otherwise associated with the counterpart system shown in FIG. 1 are eliminated or at least greatly curtailed. Even if the weld-head manipulating robotic arm 68 is employed to create some or all of the sewing-machine style motion in the arc welding head 12 (as opposed to generating all of it with the moving workpiece holder 18), the physical disconnect between parts of the particulate delivery system, e.g., between the particulate drop tube 14 and the delivery conduit 66 ensures that the harsh motion of the arc welding head 12 is not be transferred to the particulate feed apparatus 16 and/or the delivery conduit 66. One advantage gained by moving the workpiece via the moving workpiece holder 18 is that it can become easier to utilize the brief time frame in which the weld puddle is molten. In an embodiment, the particulate is dropped closer to the area just heated by the arc welding head 12 (especially, if the welding head 12 is stationary or just moving in the weld path direction), rather than possibly being deposited further downstream thereof due to system momentum.

In fact, if the moving workpiece holder 18 is capable of a full range of motion, the arc welding head 12 and the particulate feed system 16 may both to be made stationary during welding and permanently, if so desired. In a further embodiment, if the moving workpiece holder 18 supplies all of the necessary positioning for the hardfacing process, the arc welding head 12 and the particulate feed system 16 is carried with a single arm (not shown). That single arm (not shown) may be permanently fixed, if those two members were to remain stationary or robotically mounted, if positioning for non-welding procedures (e.g., particulate refill) is desired.

If the particulate feed system 16 is made permanently stationary, then arrangements may be made to bring the particulate refill to it (e.g., manually, robotically, feed line, etc.) rather than taking it to a refill station (not shown). If employed, the weld-head manipulating robotic arm 68 and the feed-apparatus carrying/manipulating robotic arm 56 may meet the travel requirements for the arc welding head 12 and the particulate feed system 16, respectively, as set forth elsewhere. For example, the feed-system manipulating robotic arm 56 may be configured for sequencing the particulate delivery system at least between a first sequencing position (as generally illustrated in FIGS. 4 and 5, but not numbered) and a second sequencing position (not illustrated). In an embodiment, the first sequencing position is at a location wherein the trough outlet 34 of the receiver trough 28 is positioned vertically above the top receiving opening (e.g., the drop tube funnel 26) of the particulate drop tube 14. The second sequencing position is a position where the trough outlet 34 of the receiver trough 28 is no longer positioned vertically above the top receiving opening of the particulate drop tube 14 and further wherein the first particulate bin 32 is located in operable range of a main particulate source/refill station (not shown) (e.g., a particulate hopper or filler hose). At such a second sequencing position, the first particulate bin 32 would thereby be able to receive an amount of the particulate from the main particulate source.

Figure 8A:
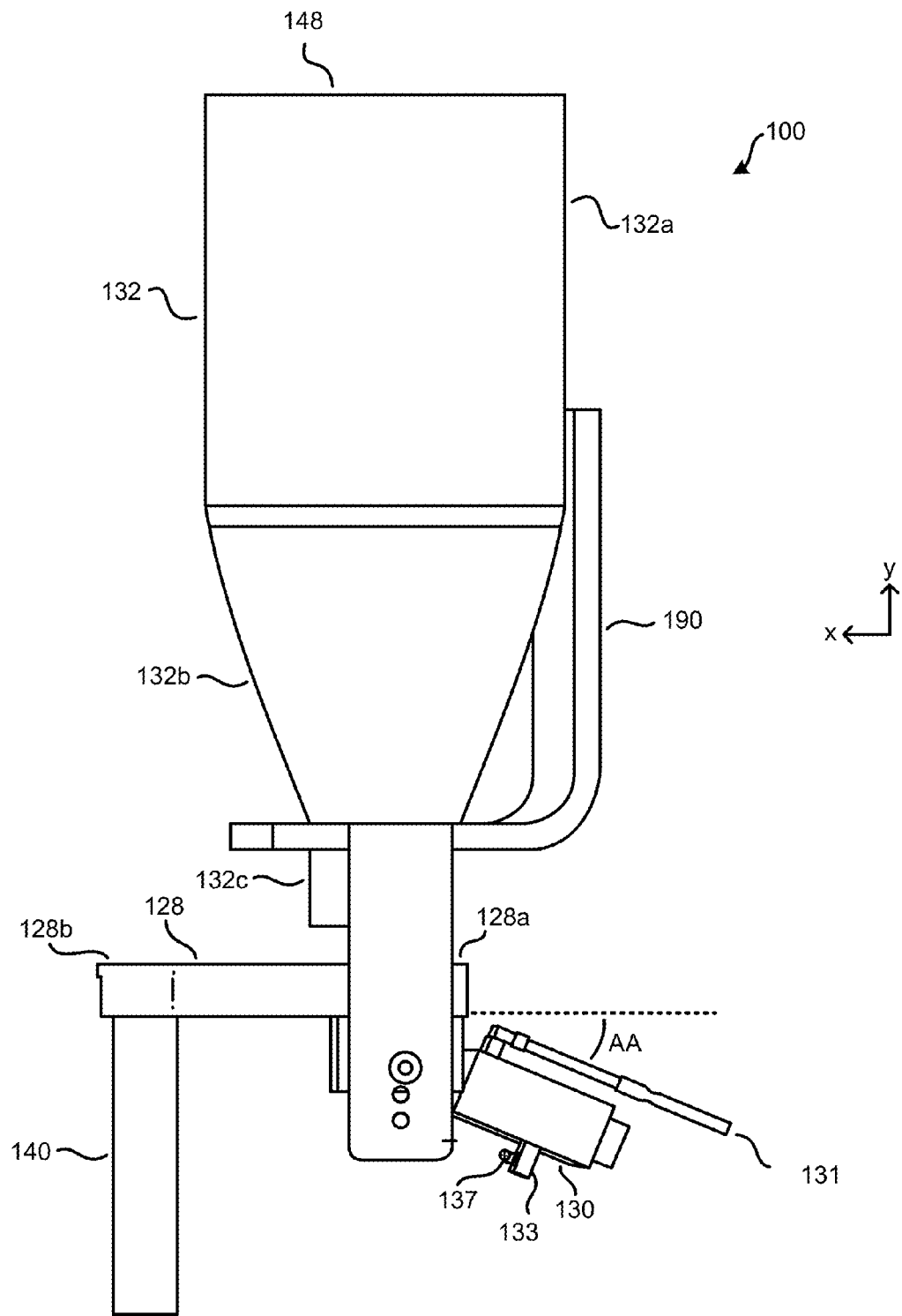
Figure 8B:
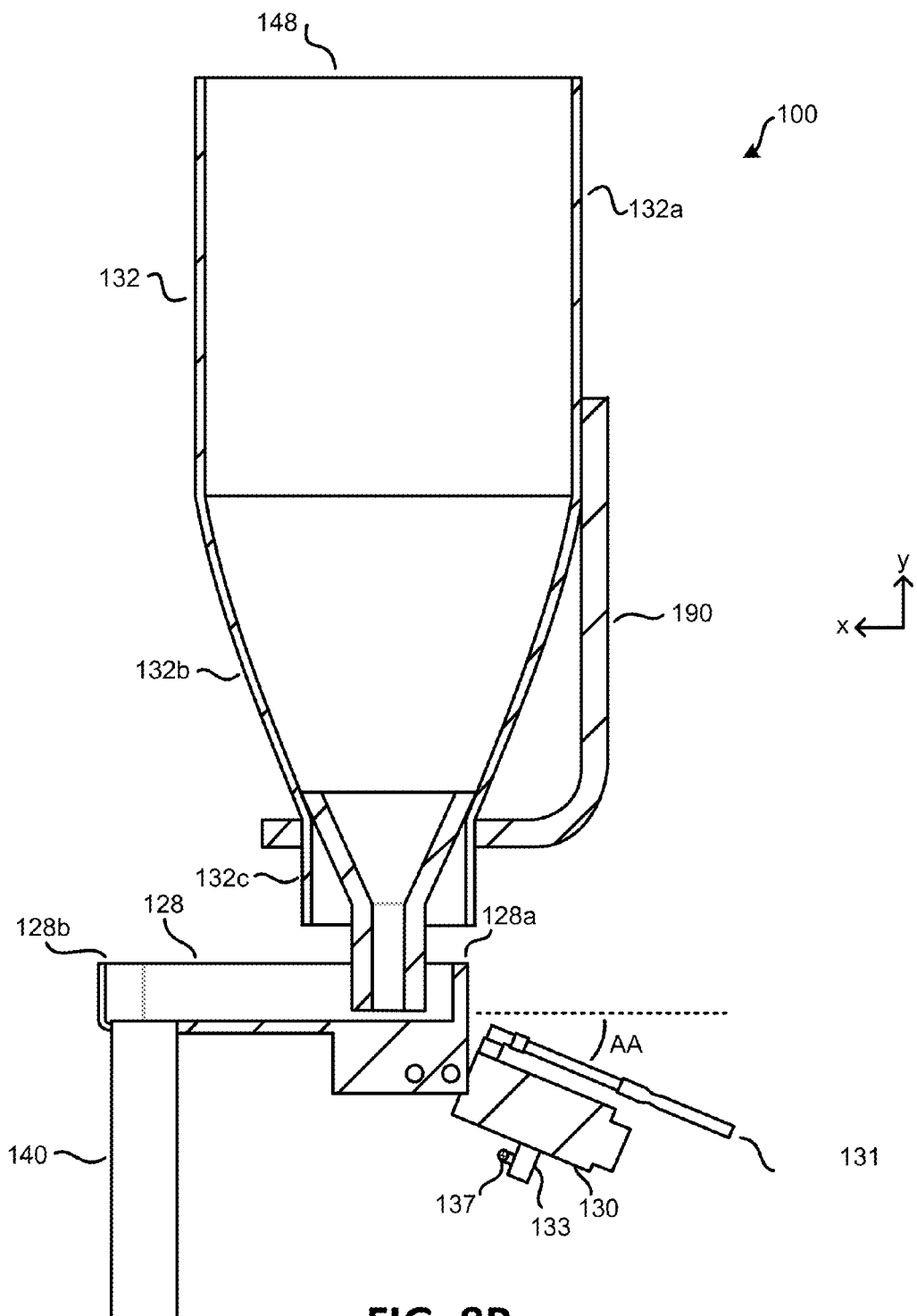
FIG. 8B shows a partial cross-sectional view of the apparatus of FIG. 8A.

FIG. 8A and FIG. 8B illustrate another embodiment of a particle feed apparatus or vibratory carbide hardfacing application system 100. The particle feed apparatus 100 may be similar to the embodiments described herein with respect to FIG. 4 through 7b, except as may be readily understood or as set forth below. In an embodiment, the apparatus 100 is generally comprised of a particle bin (or hopper) 132, a receiver trough 128, and an exit tube 140. This version of particle feed apparatus is even more compact and lightweight (e.g., about 2-3 lbs.), facilitating its use with robotics but possibly even with manual hardfacing work. Additionally, it is estimated that such particle feed apparatus could be produced for less than $250, when the other air-driven variant might cost around $2000 or more.

In an embodiment, the hopper 132 is configured for receiving particles to be deposited in a weld puddle as described above. In a further embodiment, the hopper 132 comprises an upper cylindrical section 132a that extends downwardly into a conical portion 132b and ending a lower cylindrical bin outlet 132c. The outlet 132c facilitates the flow of particles from the hopper 132 to the receiver trough 128. The cylindrical cross-section of the hopper 132 may promote more even flow of the particles from the hopper 132 to the receiver trough 128 and exit tube 140.

In an embodiment, a bracket 190 is attached to the hopper 132, for example via a weld or other mechanical attachment means (e.g., nut/bolt). In an embodiment, the bracket 190 allows the apparatus 100 to be attached to a robotic arm or to a stationary site. As described below, in a further embodiment the bracket 190 facilitates the connection of the trough 128 and a pneumatic vibrator 130 to the apparatus 100.

In an embodiment, the receiver trough 128 is attached to the bracket 190 such that a proximate end 128a of the trough 128 is positioned under the hopper outlet 132c to receive the particles from the hopper 132 and a distal end 128b comprising a particle outlet. In a further embodiment, the receiver trough 128 is positioned such that the trough 128 is substantially perpendicular to the hopper 132 with the proximate end 128a under the outlet 132c and the distal end 128b extending therefrom. In an additional embodiment, the trough 132 is angled slightly upward relative to the x-axis from the trough's proximate end 128a. In other words, the distal end 128b is slightly raised above the proximate end 128a which may tend to keep the particles from prematurely exiting the trough 128. In embodiments, the trough 128 is angled between 1 and 10 degrees from the proximate end 128a relative to the horizontal x-axis, preferably between 1 and 8 degrees, and more preferably between 2 and 5 degrees.

In an embodiment, the exit tube 140 is attached to the distal end 128b of the trough 128 and extends downwardly in a generally vertical direction to deliver particles into the weld puddle, as described in greater detail below. In an embodiment, the exit tube 140 may be in communication with drop tube 14 as described above In an embodiment, the apparatus 100 further comprises a pneumatic-drive or air driven vibrator 130 mounted to the bracket 190 which may facilitate the movement of the particles through the apparatus 100. The vibrator 130 may have an input line 131 and a back pressure/exhaust line 133. Operation of the vibrator 130 may thus be controlled using the input line 131 or the exhaust line 133. A valve, 137, is shown connected to the exhaust line; this valve may be used for backpressure regulation. In embodiments, it may be advantageous for the pneumatic vibrator 130 to be run via the exhaust line 133, which may provide more consistent operation of the apparatus 100. In an embodiment, the vibrator 130 is mounted to the bracket 190 such that the vibrator 130 is at an angle AA of approximately 10 to 20 degrees relative to the trough 128. In additional embodiments, angle AA is 15-20 or approximately 18 degrees relative to the trough 128. The use of the vibrator 130 mounted at the angle AA relative to the trough may tend to promote an even and controllable flow of the particles through the apparatus 100.

The rate of flow of the particles through the apparatus 100 may be predominately driven by the vibrator 130. By changing the amount of air pressure to the vibrator 130, the vibrations can be manipulated in order to control the particles exiting the apparatus 100. By increasing the pressure to the vibrator 130, the amount of particles delivered by the apparatus 100 may be increased, and vice versa. Accordingly, the apparatus 100 may allow for more controlled application of the particles based on the desired density of the particles for particular applications (e.g., around high-wear areas). It may thus be possible to complete the hardfacing application in a single pass operation rather than in multiple passes.

In embodiments, the vibrator 130 may be equipped with electronic components necessary for operating the apparatus 100 via programming. The programming may control the use of the robotic arm, if desired, as well as the amount of air to the vibrator 130, thus controlling the vibrations and the resulting amount of particle flow.

In use, particles are placed in the hopper 132. The placement of the trough 128 at the outlet of the hopper 132c, and the slight angle of the trough 128, as described above, inhibits the flow of the particles from the hopper 132. Air is provided to the vibrator 130 via the input line 131 or the back pressure/ exhaust line 133. As the vibrator 130 agitates the trough 128, the particles are moved toward the trough distal end 128b where they exit the apparatus 100 via the exit tube 140. As particles move from the trough's proximate end 128a to the distal end 128b, additional particles exit the hopper outlet 132c. The vibrations can be increased or decreased as noted above in order to customize the amount of particles delivered by the apparatus.

Although not required, it may be beneficial for the various components of the apparatus 100 (e.g., the hopper 132, the receiver trough 128, the bracket 190, etc.) to be made of lightweight materials, such as aluminum. This may allow the apparatus 100 to be incorporated onto a robotic arm for ease in moving the particle feed apparatus 100 as necessary. For example, in some embodiments, the entire apparatus weighs less than five pounds, and more preferably less than two pounds.

In yet another variation, the air-driven vibrator of the particulate feed apparatus is replaced with a rotatable auger (not shown) as the driving mechanism for moving the particulate along the receiver trough toward the trough outlet. The rotatable auger may be received in the receiver trough and may further be driven by, e.g., a variable-speed or multi-speed motor, thus facilitating the ability to control the rate at which the particulate (e.g., carbide) is delivered to the trough outlet 34 and, ultimately, to the weld region. The auger may, for example, be a spiral brush (e.g., with plastic or hard-metal bristles), a plastic spiral, or another acceptable form. The configuration of the auger may be chosen on the basis of, e.g., cost, wear-resistance/durability, effectiveness in moving particulate, etc. Like the air-driven vibrator 30, the auger-based delivery means is lightweight (possibly 1-2 pounds or less for the auger/motor combination), does not involve introducing large system vibrations that can contribute to inefficient particulate delivery, and offers the opportunity for controlled amounts of particulate to be delivered to a given weld region.

The particle delivery system supplies particles at a measured rate towards the workpiece, which may be termed a drop rate. The efficiency of capture of particles into the weld pool may generally be less than the drop rate.

The volume fraction of wear resistant particles in the hardfacing may be from 30% to 60%, 30-55%, 30-50%, 40 to 60%, or 30 to 50%. An average volume fraction may be determined for a particular zone or region within the hardfacing by averaging several measurements. In an embodiment, the wear resistant particles are substantially uniformly distributed when the average volume fraction of particles comprising tungsten carbide in each of the inner, middle and outer zones (e.g. thirds) of the hardfacing is from 30 to 60% or 30 to 50%. In an embodiment, the volume fraction of particles comprising tungsten carbide in the hardfacing may be measured from the area fraction of particles comprising tungsten carbide obtained from a cross-section of the hardfacing.

A weight fraction of wear resistant particles can also be calculated. The weight of the hardfacing may be measured by measuring the weight of the piece to which the hardfacing is to be applied both prior to and following application of the hardfacing. The weight of the filler metal supplied to the hardfacing process may also be calculated. The difference of the hardfacing weight and the weight of the metal supplied to the hardfacing process gives a measure of the weight contribution of the wear resistant particles. The weight fraction of the wear resistant particles can then be taken as the ratio of the weight of the wear resistant particles to the weight of the hardfacing, as a whole. The weight fraction of wear resistant particles may be from 10-55%, 10-20%, 20-30%, 30-55%, 30-50%, 40-55% or 40-50%.

The number of particles comprising within a given measurement area is another parameter which can be used to characterize the hardfacing. In an embodiment, the number of particles per square centimeter is from 90 to 150 (about 580 particles per square inch to about 970 particles per square inch); this number of particles per unit area may be present in combination with a volume fraction of particles of 30 to 60%; or 40 to 60%.

As used herein, tungsten carbide particles can include WC, $W_2C$, other tungsten carbide phases, and mixtures thereof. Particles comprising tungsten carbide particles obtained from recycling of a cemented tungsten carbide material can also contain relatively small amounts of other materials such as binder material and/or coating material. For example, the particles comprising tungsten carbide may also contain cobalt, as well as smaller amounts of iron, titanium, and phosphorous, along with other possible elements. The volume fraction of particles comprising tungsten carbide in the hardfacing may be from 30% to 60%, 30-55%, 30-50%, 40 to 60%, or 30 to 50%. In an embodiment, the volume fraction of particles comprising tungsten carbide in the hardfacing may be measured from the area fraction of particles comprising tungsten carbide obtained from a cross-section of the hardfacing. Therefore the area fraction of particles obtained from a cross-section of the hardfacing may also be from 30% to 60%, 30-55%, 30-50%, 40 to 60%, or 30 to 50%.

In other embodiments, silicon carbide (SiC) and/or boron carbide are fed to the weld pool. SiC has high hardness, good thermal shock, low density, high temperature oxidation and corrosion resistance and relatively low cost. Boron carbide is the fourth hardest material after diamond, CBN and some types of SiC (Field, 1992) and has a relatively low density and cost. The carbon content in boron carbide creates significant influence on its mechanical properties, hardness and fracture toughness. In 8.8 to 20 at % C, boron carbide exists in rhombohedral form and is usually designated B13C2 or B4C, which revealed the highest hardness value compare to other composition of boron carbide that have been recorded (Loubet et al, 1989). In embodiments, the total amount of silicon carbide and/or boron carbide fed to the weld pool is less than 15 wt % or less than 12 wt %. In an embodiment, the drop rate of carbide particles to the weld pool is 0.5 to 5 g/s. In an embodiment where 10 to 35% tungsten carbide particles are added, the drop rate is from 2 to 5 g/s.

In an embodiment, the size of the particles supplied to the hardfacing process can be characterized by a mesh size range. As is known to the art, the mesh size refers to the size of the wire mesh used to screen the particles. In an embodiment, the mesh sizes used herein are per ASTM standard E-11 and may be US standard sieve numbers. As used herein, when the particle size is classified as 12-25 mesh, a majority of the particles are within the 12-25 mesh range, with a minority (for example 5-10%) being either greater than 12 mesh or less than 25 mesh. For reference, the nominal sieve opening for a no. 12 sieve is about 1.70 mm, the nominal sieve opening for a no. 25 sieve is about 0.710 mm, the nominal sieve size opening for a no. 30 sieve is about 0.6 mm and the nominal sieve size opening for a no. 40 sieve is about 0.425 mm (US Standard sieve sizing). If any dissolution of the particles comprising tungsten carbide occurs during the hardfacing process, the size of the particles may decrease from these initial values. In addition, some of the smaller particles (e.g. those which pass through a no. 30 sieve) may dissolve completely. The size of the wear resistant particles added to the weld pool may be 10 to 25 mesh; 12-24 mesh, 12 to 25 mesh; 12 to 30 mesh; 12 to 40 mesh; 12 to 18 mesh; or 18 to 25 mesh As used herein, an iron based alloy or metallic material is an alloy or metal in which iron is the element present in the highest concentration. In an embodiment, the consumable wire electrode is a made of a mild or low-carbon steel including less than 0.3 wt % carbon. In embodiments, the wire metal may be a plain carbon steel or a low alloy steel. The consumable electrode may be referred to by its AWS (American Welding Society) classification. Suitable filler wires include, but are not limited to ER70S type (L59) or ER90S type (LA90 type). The specified composition of ER70S-6 is 0.06-0.12% C, 1.40-1.85% Mn, 0.8-1.15% Si, 0.035% max S, 0.025% P, 0.5% max C, 0.15% max Ni, 0.15% max Cr, 0.15% max Mo, and 0.03% max V. The specified composition of ER90X-D2 is 0.07-0.12% C, 1.60-2.10% Mn, 0.5-0.8% Si, 0.15% max % Ni, 0.40-0.60% Mo, 0.025% max S, 0.025% max P, and 0.5% max Cu. Suitable plain carbon steels include, but are not limited to, steels represented by the AISI/SAE designation 10xx, 15xx, 13xx, 11xx and 12xx, where the last two digits of the designation represent the carbon content, steels represented by ASTM designations A572 (all grades) and ASTM A514 (all grades) and proprietary steels such as Hardox and Wearform. In an embodiment, low alloy steels have a total alloy content less than 8 wt %. Suitable low alloy steels include steels represented by the AISI/SAE 40xx, 41xx, 43xx, 44xx, 46xx, 47xx, 48xx, 50xx, 51xx, 50xxx, 51xx, 61xx, 81xx, 86xx, 87xx, 88x, 92xx, 93xx or 94xx, where the last two or three digits of the designation represent the carbon content.

The base metal may be ferrous. In an embodiment, the base metal may be a steel. As used herein, a steel is an alloy of iron containing less than 2 wt % carbon. In embodiments, the base metal may be a plain carbon steel or a low alloy steel. Suitable plain carbon steels include, but are not limited to, steels represented by the AISI/SAE designation 10xx, 15xx, 13xx, 11xx and 12xx, where the last two digits of the designation represent the carbon content, steels represented by ASTM designations A572 (all grades) and ASTM A514 (all grades) and proprietary steels such as Hardox and Wearform. In an embodiment, low alloy steels have a total alloy content less than 8 wt %. Suitable low alloy steels include steels represented by the AISI/SAE 40xx, 41xx, 43xx, 44xx, 46xx, 47xx, 48xx, 50xx, 51xx, 50xxx, 51xx, 61xx, 81xx, 86xx, 87xx, 88x, 92xx, 93xx or 94xx, where the last two or three digits of the designation represent the carbon content.

In an embodiment, the as-fabricated thickness of the hardfacing may be from 1 mm (about 0.039") to 25 mm (about 1"), from 2 mm (about 0.08") to 25 mm, or from 5 mm (about 0.2") to 25 mm. In an embodiment, such thickness is from 2.5 mm to 5.0 mm. The thickness of hardfacing may vary somewhat along the article to which it is applied. In another embodiment, the variation in thickness of the hardfacing is 0-25%, 0-30% or 0-50%. It is to be understood that the amount of hardfacing applied to a given area of a part may be chosen by the operator and/or programmer. That is, different portions/faces of a given part may have different amounts of hardfacing material applied thereto, based on, for example, expected wear in a given location, cost considerations, etc. As a result, a part could have a small amount of hardfacing on one set of faces and a substantial amount on another set of faces.

In an embodiment, the wear resistance of the hardfacing may be assessed by methods known to the art. In an embodiment, the abrasive wear resistance of the hardfacing may be assessed using ASTM standard B611, which was developed for cemented carbides. In an embodiment, the wear resistance is indicated by a wear number. In embodiments, the wear number is from 3.0 to 6.0, from 5.5-11; 6.0 to 11; 6.5 to 11; or 7 to 11.

The physics of embodiments of the present apparatus and methods in which oscillatory movement of the weld pool is induced may enhance such factors as mixing/distribution of the carbide/particulate material within the weld pool and a reduced opportunity of nucleation of secondary phase materials proximate the added hardfacing material, which are surprising beneficial results within the resultant hardfacing microstructure. Such results can be produced with a variety of particulate delivery system and/or the welding gun positioning/movements described herein. Meanwhile, not oscillating the welding gun and particulate delivery system during formation of the hardfacing weld may increase the wear lifetime of those components and/or make it possible to more precisely control the delivery rate of the hardfacing particulate.

Typically, the center of the weld pool can reach a very high temperature from 3630 to 4530° F., while at the sides of the weld pool (right and left) the temperature is typically 1800° F. less than temperature in the center of the weld pool. In an embodiment, the oscillation movement of a part or workpiece during hardfacing can also reduce the formation of secondary phase and decrease the dilution around tungsten carbide. When tungsten carbide particles are added into the weld pool, the tungsten carbide particles can dilute and react with the molten iron weld matrix, forming secondary phase. The longer the time the tungsten carbide particle stays in molten steel (without weld matrix movement), the higher the dilution area and allowing higher formation of secondary phases (e.g. W—C—Fe). Without wishing to be bound by any particular belief, with oscillation of the sample the movement of weld matrix allows the heat to distribute evenly throughout the weld matrix. In addition, large numbers of tungsten particles can be captured during oscillation of the sample; as the number of tungsten carbide particles increase the amount of heat that was shared among WC particles inside the weld pool can be reduced as the number of WC particle increased.

Some of the units referred to herein may not be metric units. Conversions for any non-metric units are well known in the art, and any metric unit equivalents for non-metric units referred to herein are intended to be encompassed by the disclosure herein (for example, one inch is equivalent to approximately 2.54 cm).

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a compound is claimed, it should be understood that compounds known in the prior art, including certain compounds disclosed in the references disclosed herein (particularly in referenced patent documents), are not intended to be included in the claim.

In general the terms and phrases used herein have their art-recognized meaning, which can be found by reference to standard texts, journal references and contexts known to those skilled in the art. The preceding definitions are provided to clarify their specific use in the context of embodiments of the invention.

When a compound is claimed, it should be understood that compounds known in the art including the compounds disclosed in the references disclosed herein are not intended to be included. When a Markush group or other grouping is used herein, all individual members of the group and all combinations and subcombinations possible of the group are intended to be individually included in the disclosure.

Every formulation or combination of components described or exemplified can be used to practice the invention, unless otherwise stated. Specific names of compounds are intended to be exemplary, as it is known that one of ordinary skill in the art can name the same compounds differently. One of ordinary skill in the art will appreciate that methods, device elements, starting materials and synthetic methods, other than those specifically exemplified can be employed in the practice of the invention without resort to undue experimentation. All art-known functional equivalents, of any such methods, device elements, starting materials and synthetic methods are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by various embodiments and optional features, modification and variation of the concepts herein disclosed may be resorted to by those skilled in the art, and that such modifications and variations are considered to be within the scope of this invention as defined by the appended claims.

Although the description herein contains many specificities, these should not be construed as limiting the scope of the invention but as merely providing illustrations of some of the presently preferred embodiments of the invention. For example, thus the scope of the invention should be determined by the appended claims and their equivalents, rather than by the examples given.

The invention may be further understood by the following non-limiting examples.

EXAMPLE 1

Figure 10A:
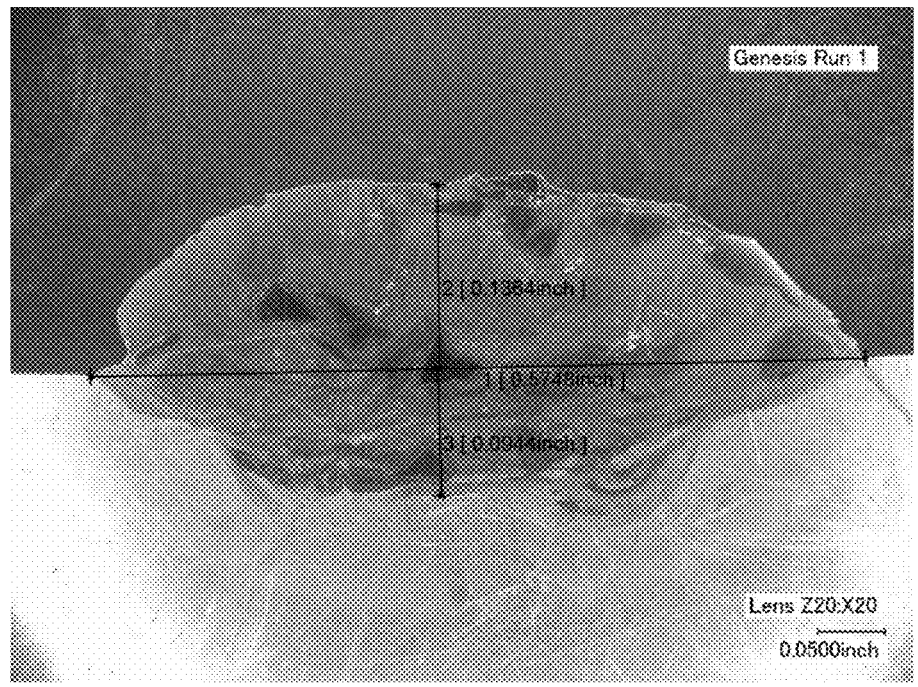
FIG. 10A and FIG. 10B show cross-sectional micrographs (20× magnification) of a hardfacing formed at a travel speed of 12 inches per minute, illustrating area percentage occupied by the particulate.
Figure 10B:
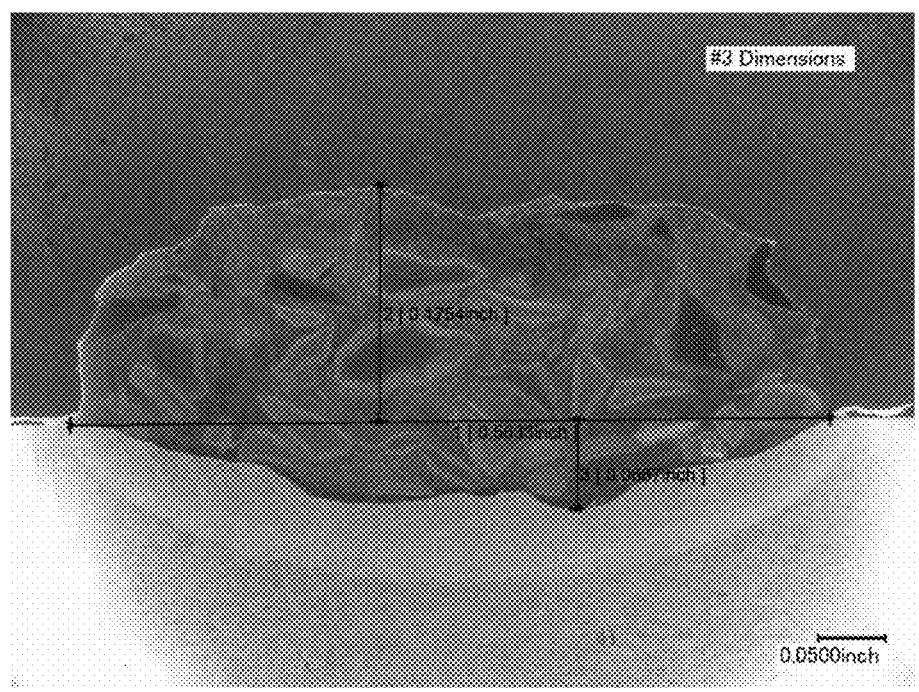

Comparison of Hardfacing Samples with Tungsten Carbide Particles with Stationary Sample and Moving Sample FIGS. 10A and 10B compare hardfacing samples with made with a lateral travel speed of 12 inches per minute and a weaving pattern. The feed wire was mild steel and the carbide particles were tungsten carbide particles (initial size 12-24 mesh). The wire feed speed and the voltage were approximately the same for both samples (350-375 inches/minute and 26 V). The carbide drop rate was 5 g/sec for both samples. FIG. 10A illustrates a hardfacing applied to a stationary sample with a moving arc welding head at an oscillation frequency of 4 Hz and an amplitude of 1 mm. The measured area fraction of carbide particles was 16%, the top height measurement labeled 2 was 0.1364 inches, the bottom height measurement labeled 3 was 0.0944 inches, and the width measurement was 0.5748 inches. FIG. 10B illustrates a hardfacing applied to a moving sample with a stationary arc welding head at an oscillation frequency of 4 Hz and an amplitude of 2.4 mm. A dwell time of 0.1 sec was used at both edges of the pattern. The measured area fraction of carbide particles was 44.4%, the top height measurement labeled 2 was 0.1754 inches, the bottom height measurement labeled 3 was 0.0667 inches, and the width measurement was 0.5633 inches.

Figure 11A:
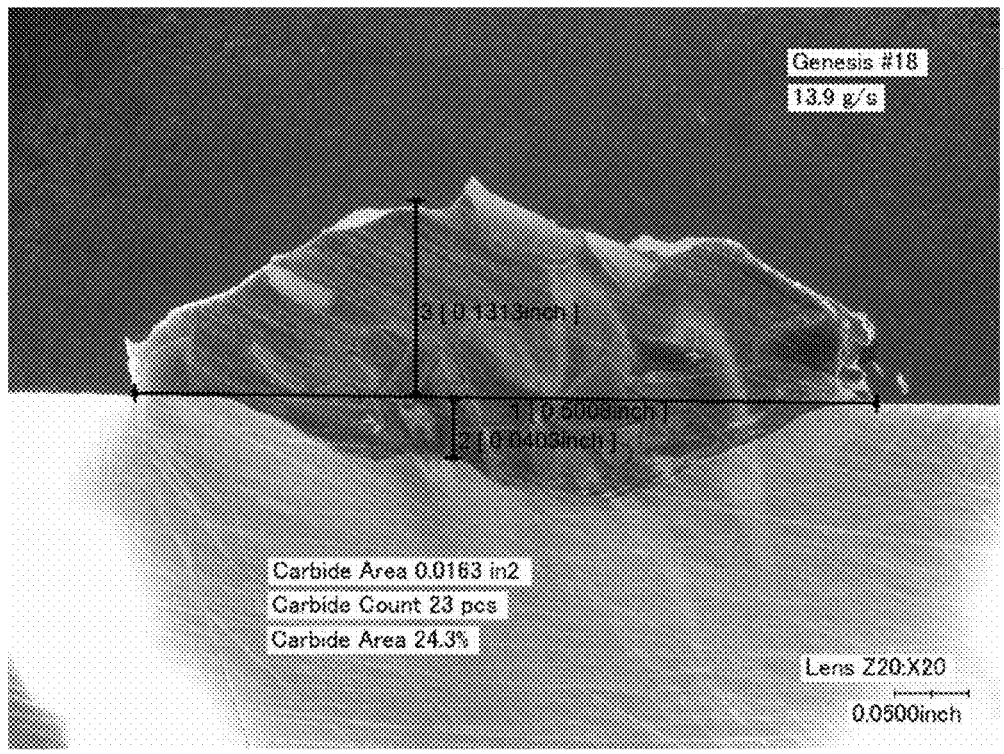
FIG. 11A and FIG. 11B show cross-sectional micrographs (20× magnification) of a hardfacing formed at a travel speed of 20 inches per minute, illustrating area percentage occupied by the particulate.
Figure 11B:
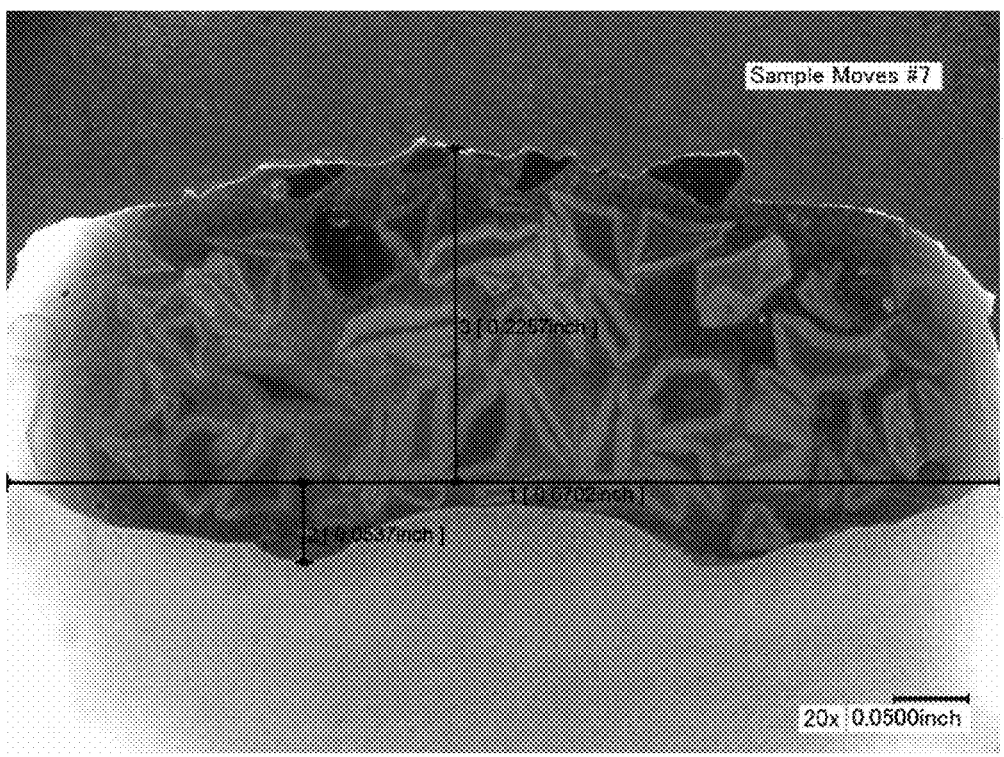

FIGS. 11A and 11B compare hardfacing samples made with a lateral travel speed of 20 inches per minute and a weaving pattern. The feed wire was mild steel and the carbide particles were tungsten carbide particles (initial size 12-24 mesh). The wire feed speed and the voltage were approximately the same for both samples and approximately the same as in FIG. 10A and FIG. 10B. The carbide drop rate was 13.9 g/second for the stationary sample and 5 g/sec for the moving sample. FIG. 11A illustrates a hardfacing applied to a stationary sample with a moving arc welding head at an oscillation frequency of 4 Hz and an amplitude of 1 mm. The measured area fraction of carbide particles was 24.3%, the top height measurement labeled 2 was 0.1313 inches, the bottom height measurement labeled 3 was 0.0403 inches, and the width measurement was 0.5008 inches. FIG. 11B illustrates a hardfacing applied to a moving sample with a stationary arc welding head at an oscillation frequency of 4 Hz and an amplitude of 2.5 mm. The measured area fraction of carbide particles was 40.6%, the top height measurement labeled 2 was 0.2257 inches, the bottom height measurement labeled 3 was 0.0537 inches, and the width measurement was 0.6702 inches.

Figure 12:
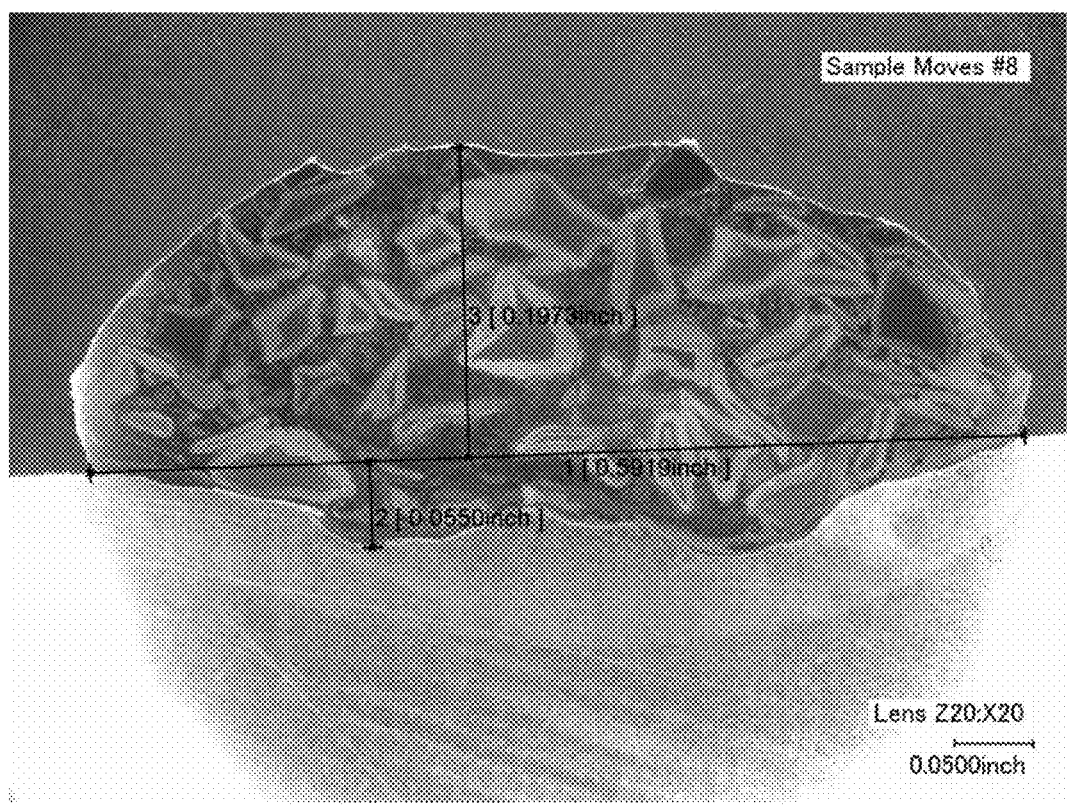
FIG. 12 shows a cross-sectional micrograph (20× magnification) of a hardfacing formed at a travel speed of 25 inches per minute with a moving sample and a stationary arc welding head, illustrating area percentage occupied by the particulate moving arc welding head.

FIG. 12 shows a cross-sectional micrograph (20× magnification) of a hardfacing formed at a travel speed of 25 inches per minute with a moving sample and a stationary arc welding head. The feed wire was mild steel and the carbide particles were tungsten carbide particles (initial size 12-24 mesh). The carbide drop rate was 5 g/sec. The wire feed speed and the voltage were approximately the same as in FIG. 10B and FIG. 11B. The oscillation frequency of 4 Hz and an amplitude of 2.5 mm. The measured area fraction of carbide particles was 35%, the top height measurement labeled 2 was 0.1973 inches, the bottom height measurement labeled 3 was 0.0550 inches, and the width measurement was 0.5919 inches.

EXAMPLE 2

Figure 13A:
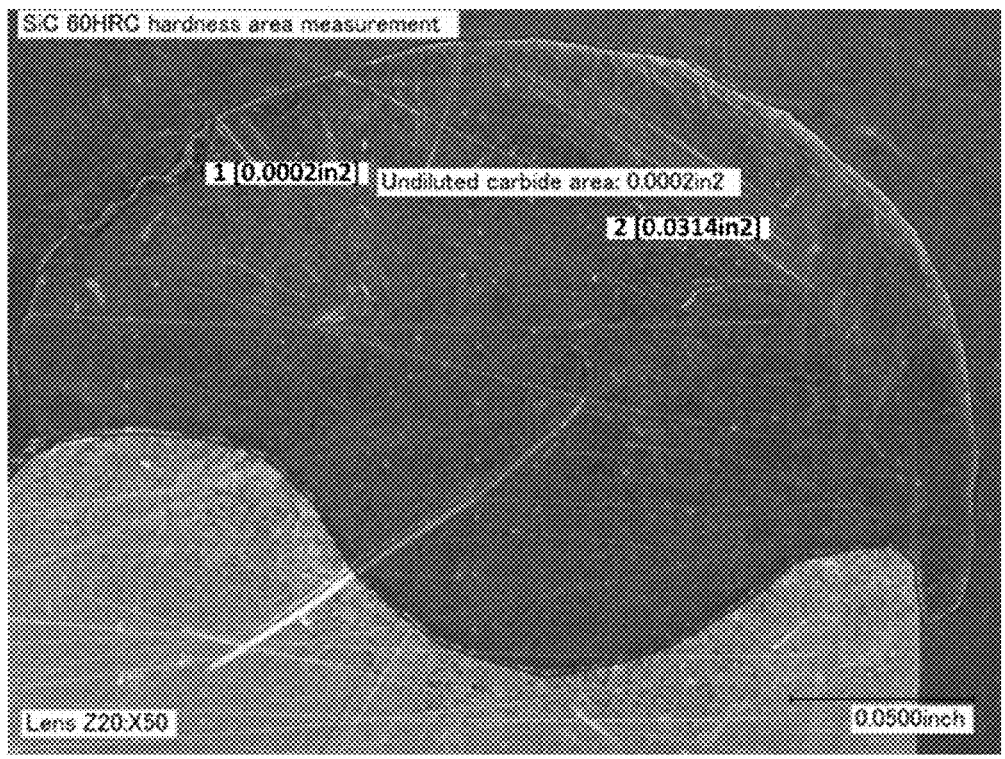
FIG. 13A shows a cross-sectional micrograph (50× magnification) of a hardfacing made with silicon carbide particles, a moving workpiece and a stationary weld gun.

Comparison of Hardfacing Samples with Silicon Carbide Particles with Stationary Sample and Moving Sample FIG. 13A shows a cross-sectional micrograph (50× magnification) of a hardfacing made with silicon carbide particles, a moving workpiece and a stationary weld gun. The percentage of hardfacing area with hardness 60 HRC and above is 100%.

Figure 13B:
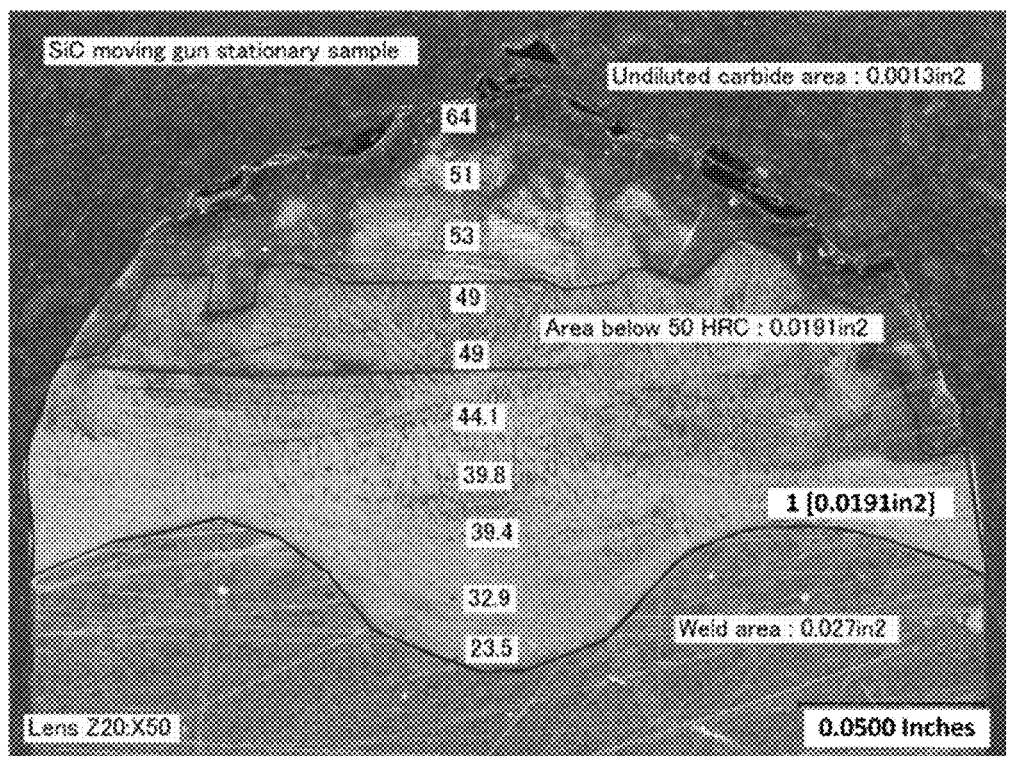
FIG. 13B shows a cross-sectional micrograph (50× magnification) of a hardfacing made with silicon carbide particles, a stationary workpiece and a moving weld gun. The percentage of hardfacing area with hardness 50 HRC and below is 100%. The numerical labels indicate hardness values (HRC).

FIG. 13B shows a cross-sectional micrograph (50× magnification) of a hardfacing made with silicon carbide particles, a stationary workpiece and a moving weld gun. The ratio of hardfacing area with hardness 50 HRC and below to the total weld area is $0.0191$ $in^2/0.027$ $in^2$. The numerical labels indicate hardness values (HRC).

Figure 14:
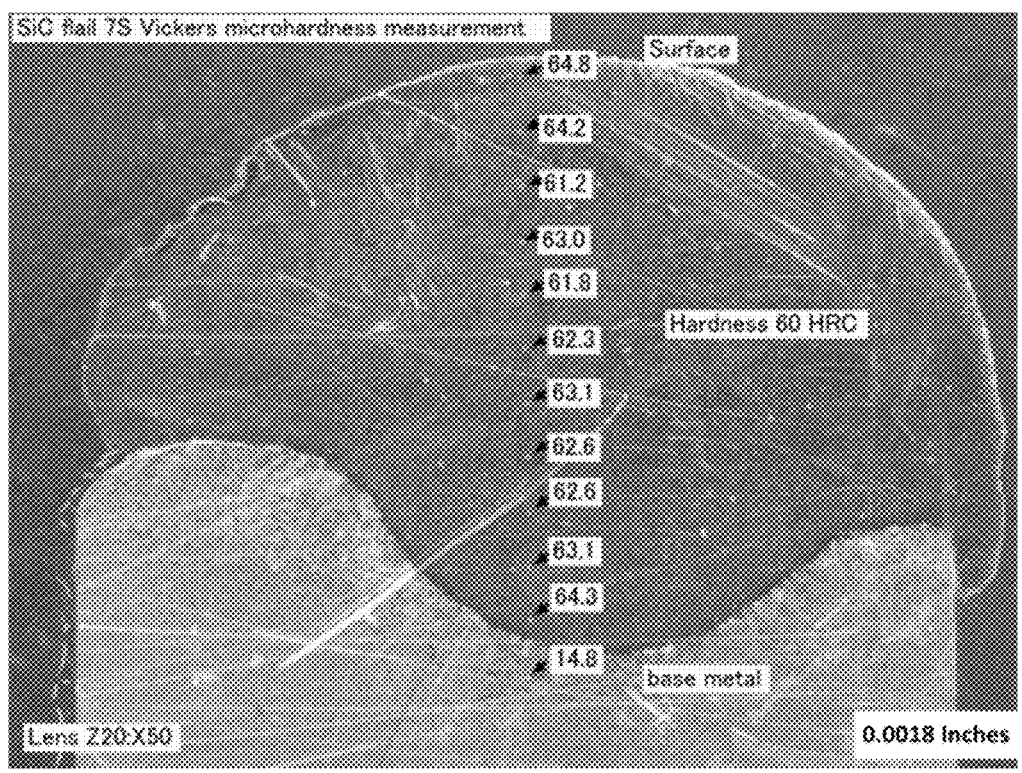
FIG. 14 shows another cross-sectional micrograph (50× magnification) of the same hardfacing as in FIG. 13A, made with a stationary workpiece and a moving weld gun. The percentage of hardfacing area with hardness 50 HRC and below is 100%. The numerical labels indicate hardness values (HRC).

FIG. 14 shows another cross-sectional micrograph (50× magnification) of the same hardfacing as in FIG. 13A, made with a stationary workpiece and a moving weld gun. The percentage of hardfacing area with hardness 50 HRC and below is 100%. The numerical labels indicate hardness values (HRC).

We claim:

1. A method for making a hardfacing layer on a metal surface of a workpiece, the method comprising the steps of:
    a) welding an iron-based filler metal to the metal surface of the workpiece by gas metal arc welding, thereby generating a weld pool, the filler metal being used as an electrode in a welding gun;
    b) feeding a plurality of carbide particles towards the weld pool with a particulate delivery system;
    c) moving the workpiece with respect to the welding gun, the workpiece being moved so as to trace an oscillatory path having a predetermined frequency and amplitude of oscillation, the frequency of oscillation being from 4 Hz to 10 Hz.

2. The method of claim 1, wherein the frequency of oscillation is 5 Hz to 10 Hz.

3. The method of claim 1, wherein the oscillatory path is a weaving path having a primary weld direction, and at least one of the workpiece and the welding gun is moved at a lateral travel speed defined along the primary weld direction.

4. The method of claim 3, wherein the workpiece is moved at a lateral travel speed defined along the primary weld direction.

5. The method of claim 1, wherein during a given weld pass the welding gun is stationary, moved so that that tip of the welding gun traces a non-oscillating path, or a combination thereof, and wherein the particle delivery system is held stationary when the welding gun is stationary and the particle delivery system is moved with the welding gun when the welding gun is moved.

6. The method of claim 5, wherein the welding gun is stationary for at least a portion of a given welding pass.

7. The method of claim 1, wherein the volume fraction of carbide particles in the hardfacing layer is from 15% to 50%.

8. The method of claim 7, wherein the volume fraction of carbide particles in the hardfacing layer is from 30% to 50%.

9. The method of claim 1, wherein the iron-based filler metal is a low carbon steel.

10. The method of claim 1, wherein the welding voltage is 24 V to 31 V.

11. The method of claim 1, wherein the carbide particles comprise at least one of a tungsten carbide, silicon carbide, and boron carbide with the carbide particles having a size from 10 to 25 mesh, the amplitude of the oscillatory path is from 0.25 mm to 10 mm, and at least one of the workpiece and the welding gun is moved at a lateral travel speed from 10 ipm to 40 ipm.

12. The method of claim 11, wherein the rate of addition of carbide particles is from 0.5 to 5 grams/second.

13. The method of claim 12, wherein the rate of addition of carbide particles is from 2 to 5 grams/second.

14. The method of claim 11, wherein the weave path further includes a dwell time of greater than zero and less than or equal to 0.05 second at each peak of the path.

15. A method for making a hardfacing layer on a metal surface of a workpiece, the method comprising the steps of:
a) welding an iron-based filler metal to the metal surface of the workpiece by gas metal arc welding, thereby generating a weld pool, the filler metal being used as an electrode in a welding gun;
b) feeding a plurality of carbide particles towards the weld pool with a particulate delivery system;
c) moving the workpiece with respect to the welding gun the workpiece being moved so as to trace an oscillatory path having a predetermined frequency and amplitude of oscillation, wherein the oscillatory path is a weaving path having a primary weld direction and the workpiece is moved at a lateral travel speed defined along the primary weld direction, wherein the frequency of oscillation is from 4 Hz to 10 Hz, the amplitude of oscillation is from 1 mm to 10 mm, and the lateral travel speed is from 10 ipm to 40 ipm.

16. The method of claim 15, wherein the frequency of oscillation is 5 Hz to 10 Hz.

17. The method of claim 15, wherein the welding gun is stationary for at least a portion of a given welding pass.

18. The method of claim 15, wherein the volume fraction of carbide particles in the hardfacing layer is from 15% to 50%.

19. The method of claim 18, wherein the volume fraction of carbide particles in the hardfacing layer is from 30% to 50%.

20. The method of claim 15 wherein the iron-based filler metal is a low carbon steel.

21. The method of claim 15, wherein the carbide particles comprise at least one of a tungsten carbide, silicon carbide, and boron carbide, the carbide particles having a size from 10 to 25 mesh.

22. The method of claim 21, wherein the rate of addition of carbide particles is from 0.5 to 5 grams/second.

23. The method of claim 22, wherein the rate of addition of carbide particles is from 2 to 5 grams/second.

24. The method of claim 15, wherein the weave path further includes a dwell time of greater than zero and less than or equal to 0.05 second at each peak of the path.

* * * * *